US012701533B2

(12) United States Patent
Yerramalli et al.

(10) Patent No.: US 12,701,533 B2
(45) Date of Patent: Aug. 4, 2026

(54) REFERENCE SIGNAL RECEIVED POWER MEASUREMENT BASED ON PEAK OF EARLIEST PATH

(71) Applicant: QUALCOMM Incorporated, San Diego, CA (US)

(72) Inventors: Srinivas Yerramalli, San Diego, CA (US); Alexandros Manolakos, Escondido, CA (US); Sony Akkarakaran, Poway, CA (US); Sven Fischer, Nuremberg (DE); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 18/260,311

(22) PCT Filed: Nov. 23, 2021

(86) PCT No.: PCT/US2021/072572
§ 371 (c)(1),
(2) Date: Jul. 3, 2023

(87) PCT Pub. No.: WO2022/169529
PCT Pub. Date: Aug. 11, 2022

(65) Prior Publication Data
US 2024/0073850 A1 Feb. 29, 2024

(30) Foreign Application Priority Data
Feb. 2, 2021 (IN) .............................. 202141004421

(51) Int. Cl.
*H04W 64/00* (2009.01)
*H04B 17/318* (2015.01)
*H04L 5/00* (2006.01)

(52) U.S. Cl.
CPC .......... *H04W 64/00* (2013.01); *H04B 17/328* (2023.05); *H04L 5/0051* (2013.01)

(58) Field of Classification Search
CPC .... H04W 64/00; H04B 17/328; H04L 5/0051; G01S 1/08; G01S 1/045; G01S 3/46;
(Continued)

(56) References Cited

U.S. PATENT DOCUMENTS 7,069,191 B1 6/2006 Moore
12,015,470 B2* 6/2024 Zhang ................. H04B 7/0695
(Continued)

FOREIGN PATENT DOCUMENTS

CN 102017555 A 4/2011
CN 102907012 A 1/2013
(Continued)

OTHER PUBLICATIONS

Intel Corporation: "Potential RAT Dependent Techniques for NR Positioning", 3GPP TSG RAN WG1 Meeting #95, R1-1812519, Intel—NR_POS_Techniques, 3rd Generation Partnership Project, Mobile Competence Centre, 650, Route Des Lucioles, F-06921, Sophia-Antipolis Cedex, France, vol. RAN WG1, No. Spokane, USA, Nov. 12, 2018-Nov. 16, 2018, 16 Pages, Nov. 11, 2018, XP051554463, Sec. 3.2, Sec. 4.2, the whole document.
(Continued)

*Primary Examiner* — Don N Vo
(74) *Attorney, Agent, or Firm* — Thien T. Nguyen

(57) ABSTRACT
In an aspect, a wireless node (e.g., UE, gNB, etc.) receives a reference signal for positioning (RS-P) over a respective bandwidth on one or more paths including an earliest path, and measures a reference signal received power (RSRP) associated with the earliest path of the RS-P based on a sum of energy on the respective bandwidth within at least one number of samples from a peak of the earliest path.

61 Claims, 13 Drawing Sheets

700

302, 304
WIRELESS NODE

RECEIVING A REFERENCE SIGNAL FOR POSITIONING (RS-P) OVER A RESPECTIVE BANDWIDTH ON ONE OR MORE PATHS INCLUDING AN EARLIEST PATH — 710

MEASURING A REFERENCE SIGNAL RECEIVED POWER (RSRP) ASSOCIATED WITH THE EARLIEST PATH OF THE RS-P BASED ON A SUM OF ENERGY ON THE RESPECTIVE BANDWIDTH WITHIN AT LEAST ONE NUMBER OF SAMPLES FROM A PEAK OF THE EARLIEST PATH — 720

(58) Field of Classification Search
CPC ..... G01S 3/10; G01S 5/02; G01S 5/04; G01S
2205/008; G01S 5/0218
USPC ....................................................... 455/456.1
See application file for complete search history.

(56) References Cited

U.S. PATENT DOCUMENTS

| | | | |
|---|---|---|---|
| 2006/0209932 A1 | 9/2006 | Khandekar et al. | |
| 2008/0004042 A1* | 1/2008 | Dietrich | H04W 64/00 |
| | | | 455/456.1 |
| 2010/0040117 A1 | 2/2010 | Lawrow | |
| 2011/0075749 A1 | 3/2011 | Sahara et al. | |
| 2011/0281579 A1 | 11/2011 | Kummetz | |
| 2012/0165040 A1* | 6/2012 | Lee | H04W 64/00 |
| | | | 455/456.1 |
| 2014/0320214 A1 | 10/2014 | Liu | |
| 2015/0036612 A1* | 2/2015 | Kim | H04B 17/382 |
| | | | 370/329 |
| 2016/0269859 A1 | 9/2016 | Nallampatti Ekambaram et al. | |
| 2018/0255556 A1 | 9/2018 | Das et al. | |
| 2018/0313930 A1 | 11/2018 | Chrabieh | |
| 2019/0320408 A1 | 10/2019 | Opshaug et al. | |
| 2020/0217918 A1 | 7/2020 | Rydn et al. | |
| 2022/0039048 A1* | 2/2022 | Khoryaev | H04L 63/1466 |
| 2023/0388959 A1* | 11/2023 | Hasegawa | G01S 5/0036 |
| 2024/0241207 A1* | 7/2024 | Cha | G01S 5/0036 |

FOREIGN PATENT DOCUMENTS

| | | |
|---|---|---|
| CN | 104054260 A | 9/2014 |
| CN | 107466462 A | 12/2017 |
| CN | 109891260 A | 6/2019 |
| KR | 20050085264 A | 8/2005 |
| WO | WO-2006102251 | 9/2006 |
| WO | WO-2014093400 A1 | 6/2014 |
| WO | 2020069083 A1 | 4/2020 |

OTHER PUBLICATIONS

International Search Report and Written Opinion—PCT/US2021/072572—ISA/EPO—Sep. 13, 2022.
Moderator (CATT): "FL Summary for Potential Positioning Enhancements", 3GPP TSG RAN WG1 Meeting #103-e, R1-2009314, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 26, 2020, XP051947555, 51 Pages, sections 2.1. 2.2. 5.2. 5.7, the whole document.
Partial International Search Report—PCT/US2021/072572—ISA/EPO—Jun. 1, 2022.
Shah S.H.A., et al., "Beamformed mmWave System Propagation at 60GHz in an Office Environment", arxiv.org, Cornell University Library, 201 Olin Library Cornell University, Ithaca, NY, 14853, Mar. 29, 2020, XP081631113, 7 Pages, the whole document.
Ericsson: "UE and gNB Measurements for NR Positioning", R1-1909426, 3GPP TSG RAN WG1 #98 Prague, CZ, Aug. 26-30, 2019, pp. 1-17.
Moderator (Ericsson): "FL Summary for AI 8.5.3 Accuracy Improvements for DL-AoD Positioning", R1-2101920, 3GPP TSG-RAN WG1 Meeting #103-e e-Meeting, Jan. 25-Feb. 5, 2021, pp. 1-47.
Taiwan Search Report—TW110143750—TIPO—Jul. 9, 2025.

* cited by examiner

306

390

REFERENCE SIGNAL RECEIVED POWER MEASUREMENT BASED ON PEAK OF EARLIEST PATH

CROSS-REFERENCE TO RELATED APPLICATIONS

The present application for patent claims priority to Indian Patent Application No. 202141004421, entitled "REFERENCE SIGNAL RECEIVED POWER MEASUREMENT BASED ON PEAK OF EARLIEST PATH," filed Feb. 2, 2021, and is a national stage application, filed under 35 U.S.C. § 371, of International Patent Application No. PCT/US2021/072572, entitled, "REFERENCE SIGNAL RECEIVED POWER MEASUREMENT BASED ON PEAK OF EARLIEST PATH", filed Nov. 23, 2021, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless node includes: receiving a reference signal for positioning (RS-P) over a respective bandwidth on one or more paths including an earliest path; and measuring a reference signal received power (RSRP) associated with the earliest path of the RS-P based on a sum of energy on the respective bandwidth within at least one number of samples from a peak of the earliest path.

In some aspects, the at least one number of samples includes a single number of samples, such that the RSRP is measured based on the sum of energy of the same number of samples on both sides of the peak of the earliest path.

In some aspects, the single number of samples is derived as a function of the respective bandwidth and an oversampling factor used to compute an Inverse Fast Fourier Transform (IFFT) samples of the RS-P.

In some aspects, the single number of samples is zero, and the sum of energy includes energy of a sample associated with the peak of the earliest path only.

In some aspects, a time threshold is defined relative to the peak of the earliest path, and the RSRP is measured based on the sum of energy of any sample that falls inside of the time threshold on either side of the peak of the earliest path.

In some aspects, the time threshold is based on the respective bandwidth, or the time threshold is a network-configured parameter.

In some aspects, the at least one number of samples comprises a first number of samples preceding the peak of the earliest path and a second number of samples following the peak of the earliest path, the first and second numbers of samples being different.

In some aspects, the first number of samples comprises one or more samples from the peak of the earliest path to a first energy valley preceding the peak of the earliest path, and the second number of samples comprises at least one sample from the peak of the earliest path to a first energy valley following the peak of the earliest path.

In some aspects, a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

In some aspects, a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

In some aspects, the RSRP is measured per antenna pair, or the RSRP is measured as an average RSRP across multiple antenna pairs.

In some aspects, the wireless node corresponds to a user equipment (UE) or a base station.

In some aspects, the RS-P corresponds to an uplink sounding reference signal for positioning (UL-SRS-P), a downlink positioning reference signal (DL-PRS), or a sidelink SRS-P (SL-SRS-P).

In some aspects, the at least one number of samples or a parameter used by the wireless node to derive the at least one number of samples is network-configured.

In some aspects, the method includes reporting the RSRP to an external entity.

In some aspects, the method includes reporting another RSRP measurement that is based upon a sum of energy across multiple paths of the RS-P.

In some aspects, the method includes deriving an angular measurement based on the RSRP.

In some aspects, the method includes reporting the derived angular measurement to an external entity.

In some aspects, the method includes determining a positioning estimate of a user equipment (UE) based on the derived angular measurement.

In some aspects, the angular measurement comprises a downlink angle of departure (DL-AoD) measurement or an uplink angular of arrival (UL-AoA) measurement.

In an aspect, a wireless node includes: a memory; at least one transceiver; and at least one processor communicatively coupled to the memory and the at least one transceiver, the at least one processor configured to: receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

In some aspects, the at least one number of samples includes a single number of samples, such that the RSRP is measured based on the sum of energy of the same number of samples on both sides of the peak of the earliest path.

In some aspects, the at least one number of samples comprises a first number of samples preceding the peak of the earliest path and a second number of samples following the peak of the earliest path, the first and second numbers of samples being different.

In some aspects, the first number of samples comprises one or more samples from the peak of the earliest path to a first energy valley preceding the peak of the earliest path, and the second number of samples comprises at least one sample from the peak of the earliest path to a first energy valley following the peak of the earliest path.

In some aspects, a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

In some aspects, a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

In some aspects, the RSRP is measured per antenna pair, or the RSRP is measured as an average RSRP across multiple antenna pairs.

In some aspects, the wireless node corresponds to a user equipment (UE) or a base station.

In some aspects, the RS-P corresponds to an uplink sounding reference signal for positioning (UL-SRS-P), a downlink positioning reference signal (DL-PRS), or a sidelink SRS-P (SL-SRS-P).

In some aspects, the at least one number of samples or a parameter used by the wireless node to derive the at least one number of samples is network-configured.

In some aspects, the at least one processor is further configured to: report the RSRP to an external entity.

In some aspects, the at least one processor is further configured to: report another RSRP measurement that is based upon a sum of energy across multiple paths of the RS-P.

In some aspects, the at least one processor is further configured to: derive an angular measurement based on the RSRP.

In some aspects, the at least one processor is further configured to: report the derived angular measurement to an external entity.

In some aspects, the at least one processor is further configured to: determine a positioning estimate of a user equipment (UE) based on the derived angular measurement.

In some aspects, the angular measurement comprises a downlink angle of departure (DL-AoD) measurement or an uplink angular of arrival (UL-AoA) measurement.

In an aspect, The wireless node of claim 22, wherein the single number of samples is derived as a function of the respective bandwidth and an oversampling factor used to compute an Inverse Fast Fourier Transform (IFFT) samples of the RS-P.

In an aspect, The wireless node of claim 22, wherein the single number of samples is zero, and wherein the sum of energy includes energy of a sample associated with the peak of the earliest path only.

In an aspect, The wireless node of claim 22, wherein a time threshold is defined relative to the peak of the earliest path, and wherein the RSRP is measured based on the sum of energy of any sample that falls inside of the time threshold on either side of the peak of the earliest path.

In some aspects, the time threshold is based on the respective bandwidth, or the time threshold is a network-configured parameter.

In an aspect, a wireless node includes: means for receiving a reference signal for positioning (RS-P) over a respective bandwidth on one or more paths including an earliest path; and means for measuring a reference signal received power (RSRP) associated with the earliest path of the RS-P based on a sum of energy on the respective bandwidth within at least one number of samples from a peak of the earliest path.

In some aspects, the at least one number of samples includes a single number of samples, such that the RSRP is measured based on the sum of energy of the same number of samples on both sides of the peak of the earliest path.

In some aspects, the single number of samples is derived as a function of the respective bandwidth and an oversampling factor used to compute an Inverse Fast Fourier Transform (IFFT) samples of the RS-P.

In some aspects, the single number of samples is zero, and the sum of energy includes energy of a sample associated with the peak of the earliest path only.

In some aspects, a time threshold is defined relative to the peak of the earliest path, and the RSRP is measured based on the sum of energy of any sample that falls inside of the time threshold on either side of the peak of the earliest path.

In some aspects, the time threshold is based on the respective bandwidth, or the time threshold is a network-configured parameter.

In some aspects, the at least one number of samples comprises a first number of samples preceding the peak of the earliest path and a second number of samples following the peak of the earliest path, the first and second numbers of samples being different.

In some aspects, the first number of samples comprises one or more samples from the peak of the earliest path to a first energy valley preceding the peak of the earliest path, and the second number of samples comprises at least one sample from the peak of the earliest path to a first energy valley following the peak of the earliest path.

In some aspects, a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

In some aspects, a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

In some aspects, the RSRP is measured per antenna pair, or the RSRP is measured as an average RSRP across multiple antenna pairs.

In some aspects, the wireless node corresponds to a user equipment (UE) or a base station.

In some aspects, the RS-P corresponds to an uplink sounding reference signal for positioning (UL-SRS-P), a downlink positioning reference signal (DL-PRS), or a side-link SRS-P (SL-SRS-P).

In some aspects, the at least one number of samples or a parameter used by the wireless node to derive the at least one number of samples is network-configured.

In some aspects, the method includes means for reporting the RSRP to an external entity.

In some aspects, the method includes means for reporting another RSRP measurement that is based upon a sum of energy across multiple paths of the RS-P.

In some aspects, the method includes means for deriving an angular measurement based on the RSRP.

In some aspects, the method includes means for reporting the derived angular measurement to an external entity.

In some aspects, the method includes means for determining a positioning estimate of a user equipment (UE) based on the derived angular measurement.

In some aspects, the angular measurement comprises a downlink angle of departure (DL-AoD) measurement or an uplink angular of arrival (UL-AoA) measurement.

In an aspect, a non-transitory computer-readable medium storing a set of instructions includes one or more instructions that, when executed by one or more processors of a wireless node, cause the wireless node to: receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

In some aspects, the at least one number of samples includes a single number of samples, such that the RSRP is measured based on the sum of energy of the same number of samples on both sides of the peak of the earliest path.

In some aspects, the single number of samples is derived as a function of the respective bandwidth and an oversampling factor used to compute an Inverse Fast Fourier Transform (IFFT) samples of the RS-P.

In some aspects, the single number of samples is zero, and the sum of energy includes energy of a sample associated with the peak of the earliest path only.

In some aspects, a time threshold is defined relative to the peak of the earliest path, and the RSRP is measured based on the sum of energy of any sample that falls inside of the time threshold on either side of the peak of the earliest path.

In some aspects, the time threshold is based on the respective bandwidth, or the time threshold is a network-configured parameter.

In some aspects, the at least one number of samples comprises a first number of samples preceding the peak of the earliest path and a second number of samples following the peak of the earliest path, the first and second numbers of samples being different.

In some aspects, the first number of samples comprises one or more samples from the peak of the earliest path to a first energy valley preceding the peak of the earliest path, and the second number of samples comprises at least one sample from the peak of the earliest path to a first energy valley following the peak of the earliest path.

In some aspects, a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

In some aspects, a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

In some aspects, the RSRP is measured per antenna pair, or the RSRP is measured as an average RSRP across multiple antenna pairs.

In some aspects, the wireless node corresponds to a user equipment (UE) or a base station.

In some aspects, the RS-P corresponds to an uplink sounding reference signal for positioning (UL-SRS-P), a downlink positioning reference signal (DL-PRS), or a side-link SRS-P (SL-SRS-P).

In some aspects, the at least one number of samples or a parameter used by the wireless node to derive the at least one number of samples is network-configured.

In some aspects, the one or more instructions further cause the wireless node to: report the RSRP to an external entity.

In some aspects, the one or more instructions further cause the wireless node to: report another RSRP measurement that is based upon a sum of energy across multiple paths of the RS-P.

In some aspects, the one or more instructions further cause the wireless node to: derive an angular measurement based on the RSRP.

In some aspects, the one or more instructions further cause the wireless node to: report the derived angular measurement to an external entity.

In some aspects, the one or more instructions further cause the wireless node to: determine a positioning estimate of a user equipment (UE) based on the derived angular measurement.

In some aspects, the angular measurement comprises a downlink angle of departure (DL-AoD) measurement or an uplink angular of arrival (UL-AoA) measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
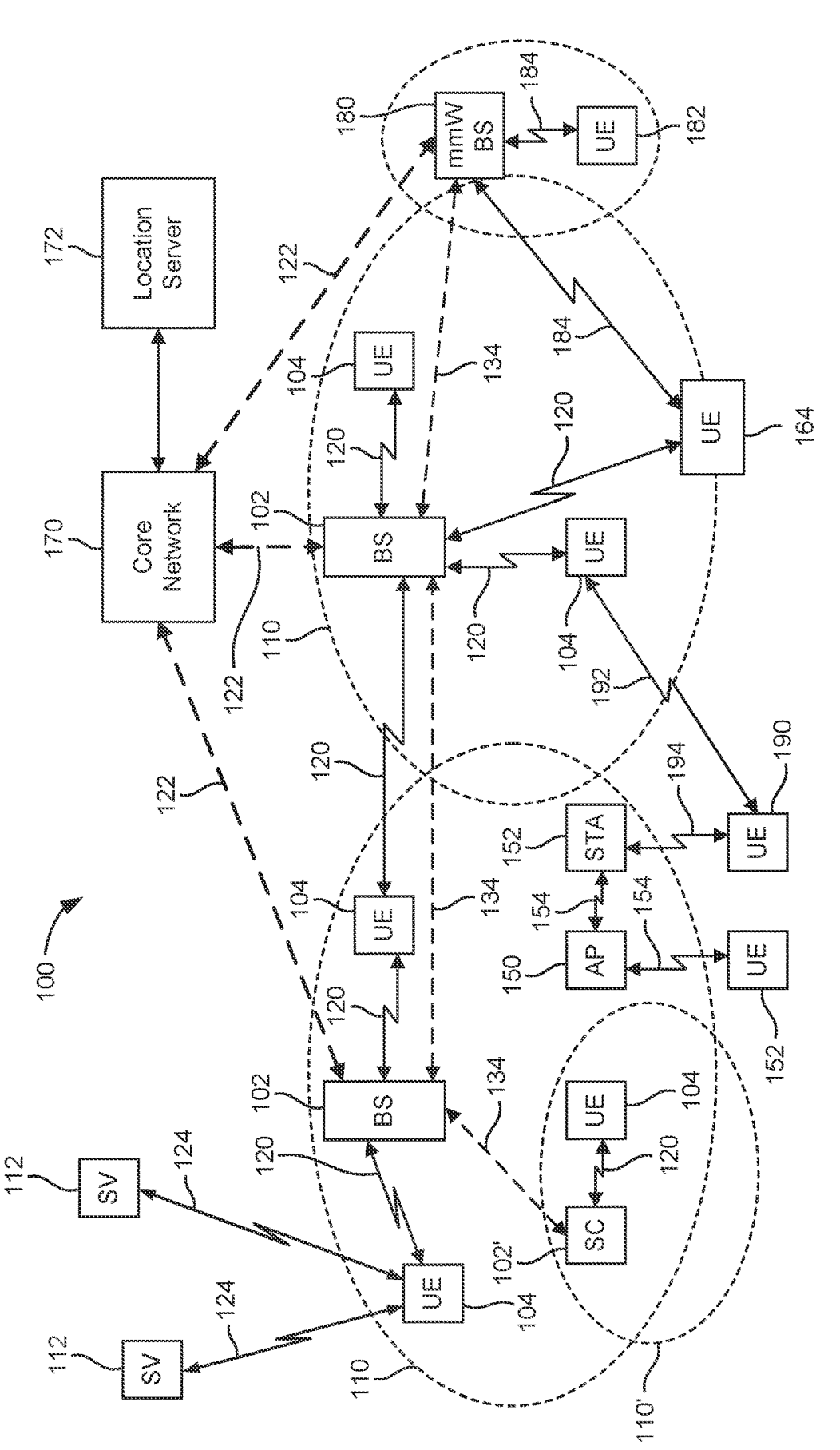
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link

184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
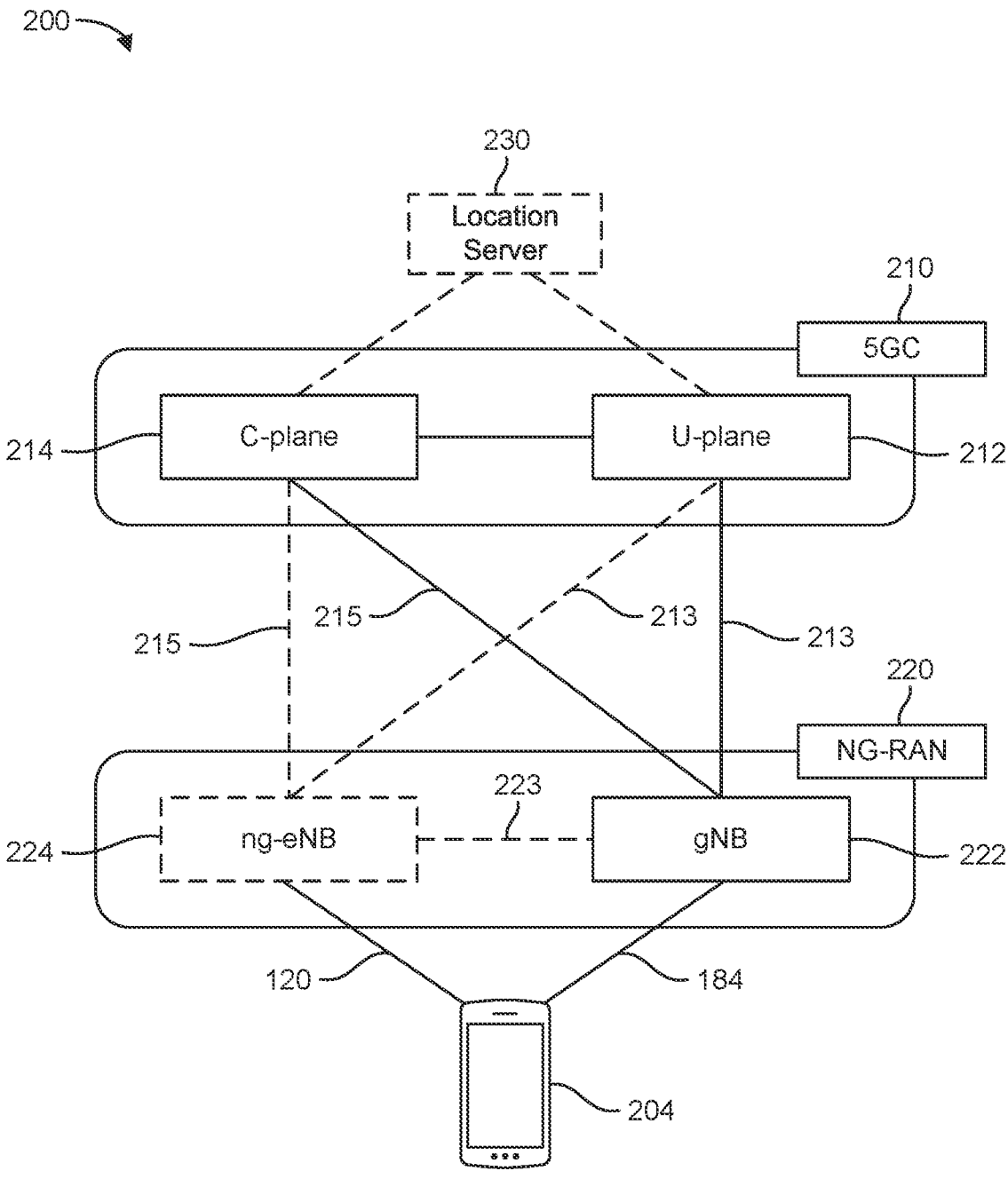
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNB s 224 and gNB s 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
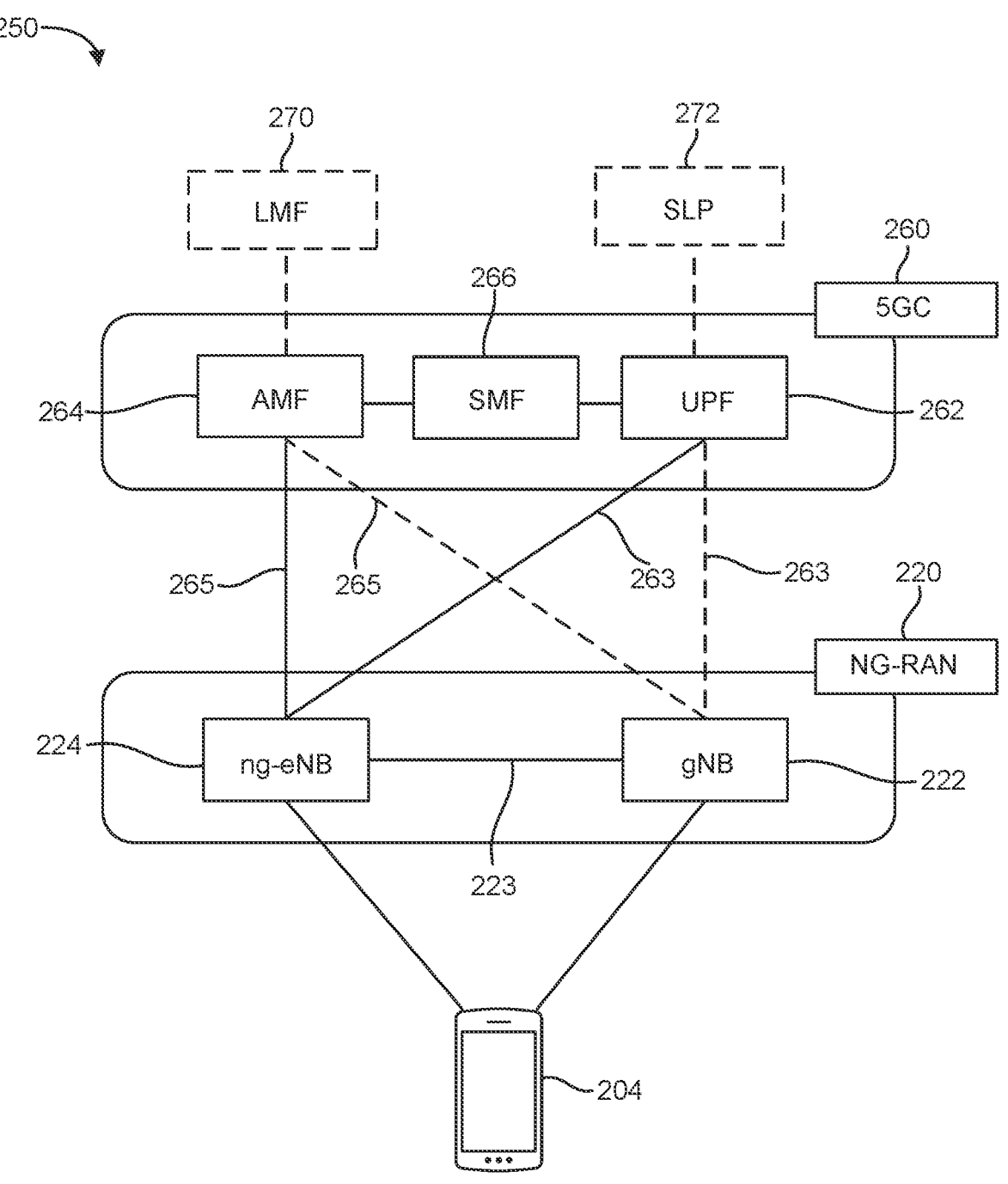

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
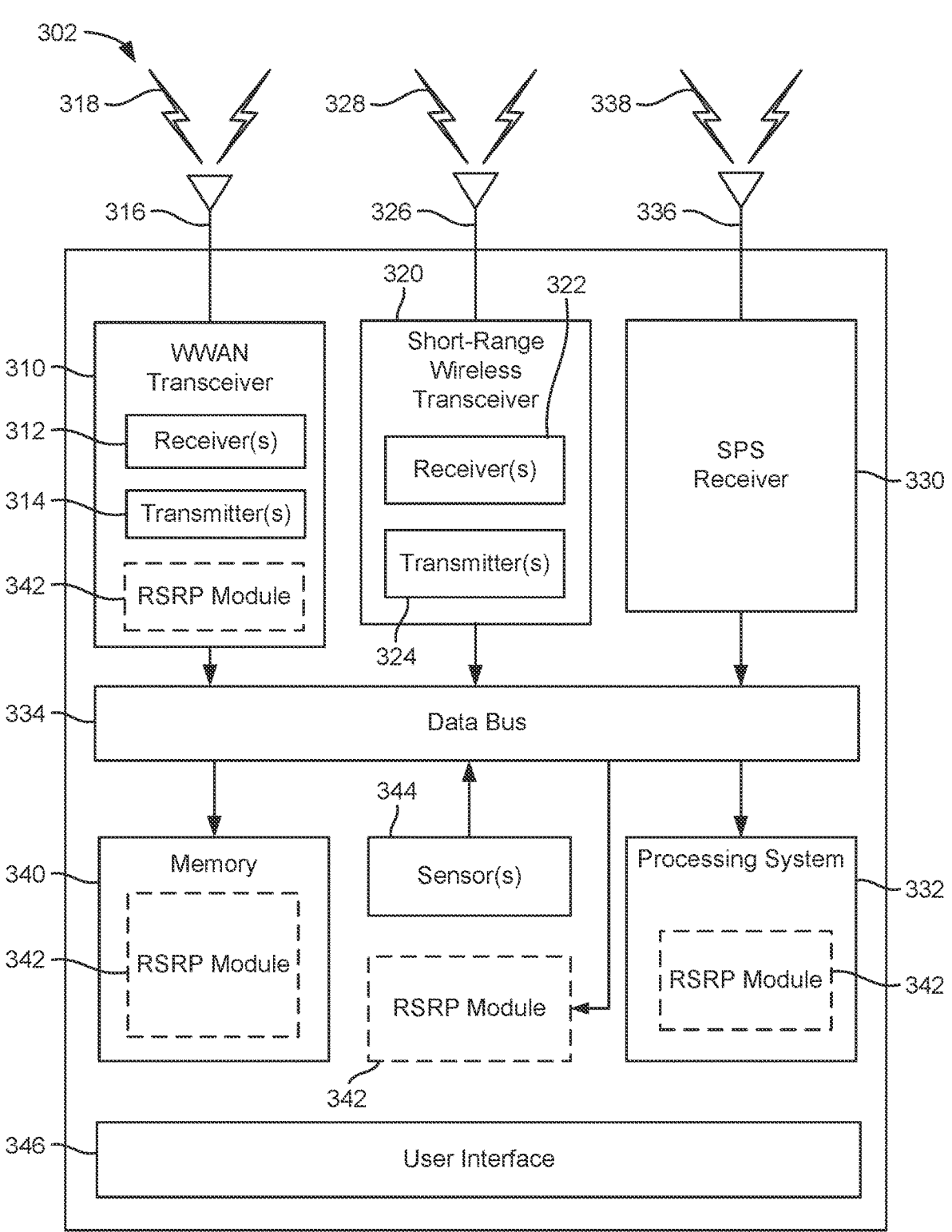
FIGS. 3A to 3C are simplified block diagrams of several sample aspects of components that may be employed in a user equipment (UE), a base station, and a network entity, respectively, and configured to support communications as taught herein.
Figure 3B:
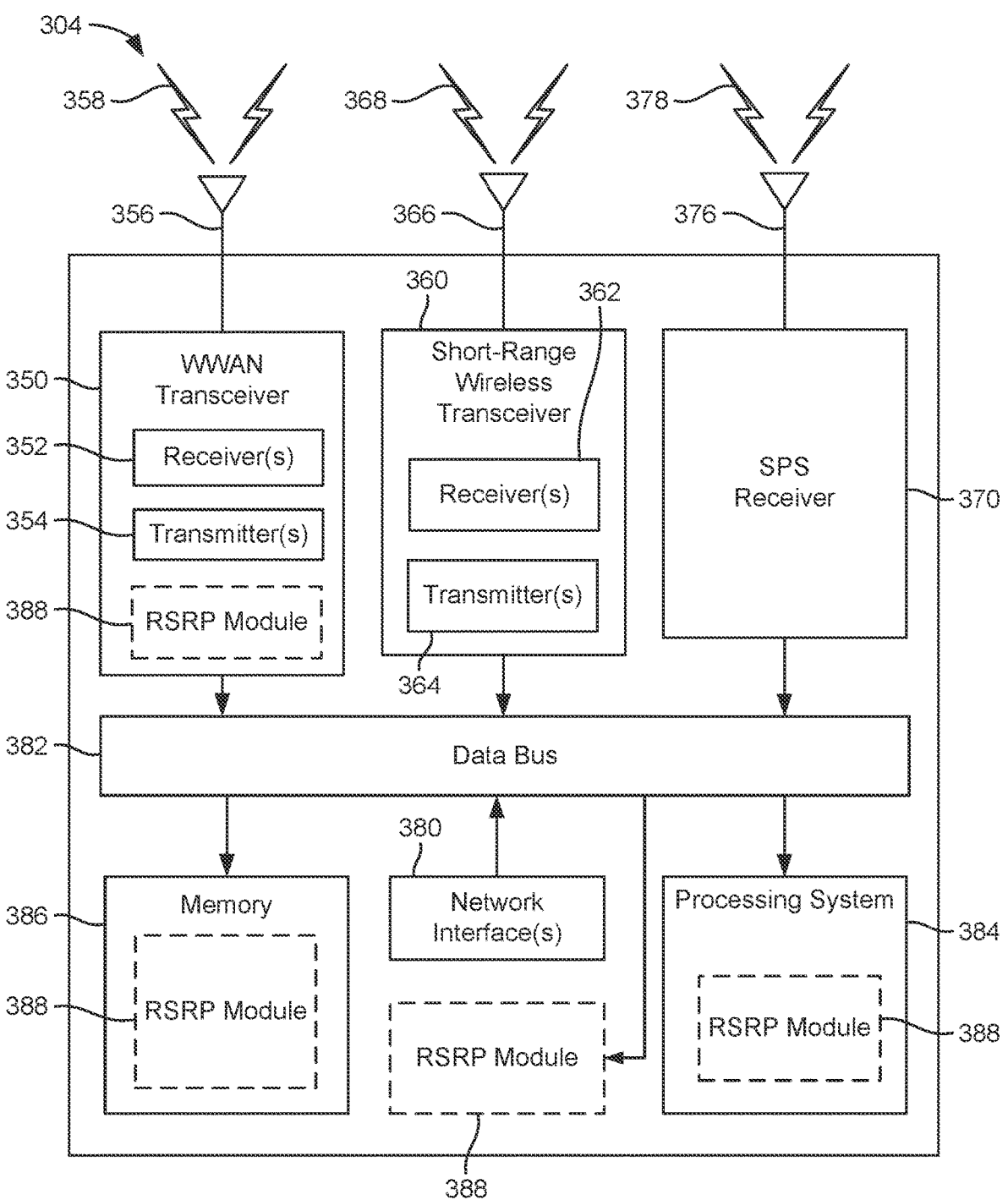
Figure 3C:
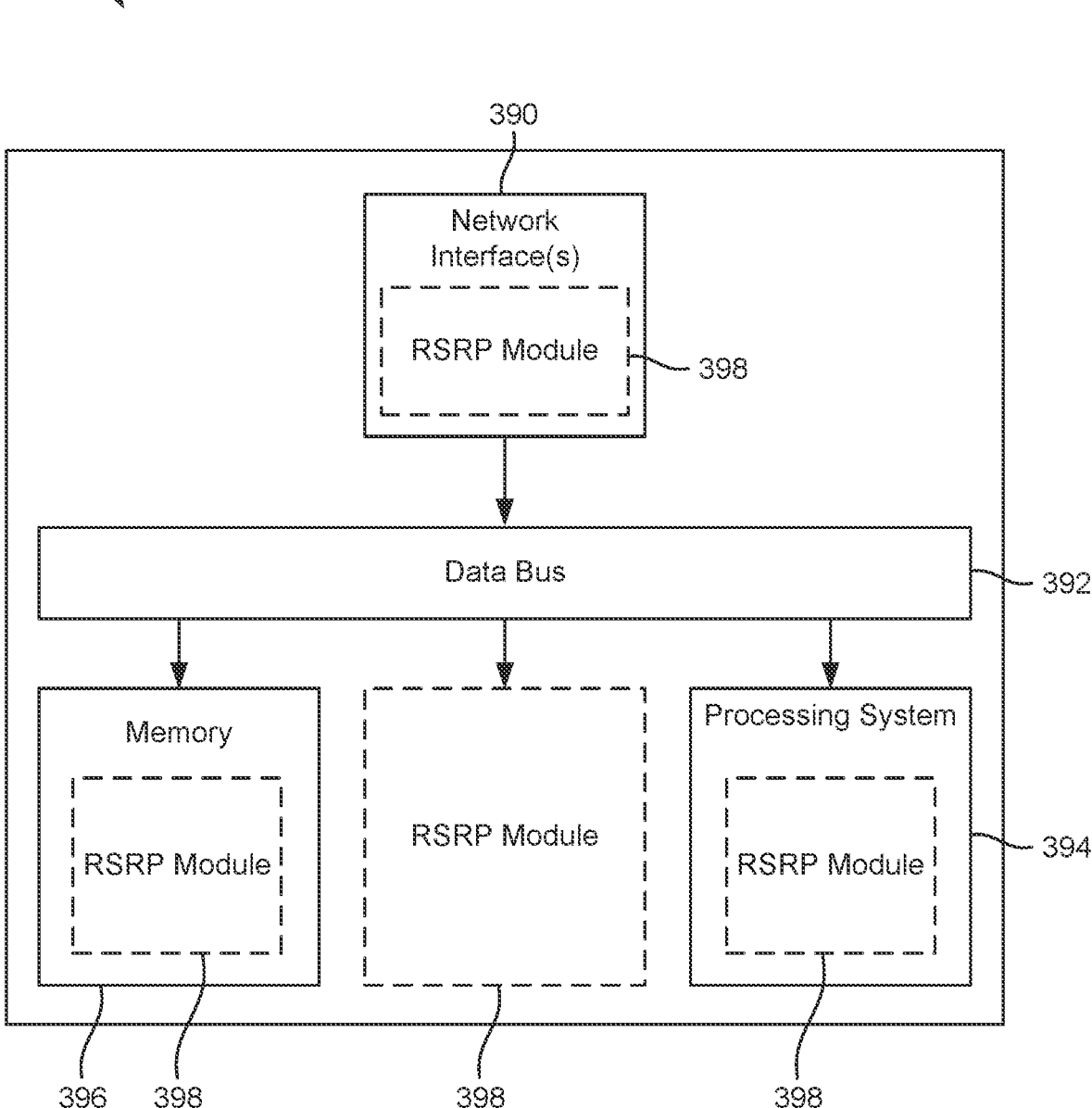

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include RSRP Modules 342, 388, and 398, respectively. The RSRP Modules 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RSRP Modules 342, 388, and 398 may be external to the processing systems 332, 384, and 394 (e.g., part of a modem processing system, integrated with another processing system, etc.). Alternatively, the RSRP Modules 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the RSRP Module 342, which may be part of the WWAN transceiver 310, the memory component 340, the processing system 332, or any combination thereof, or may be a standalone component. FIG. 3B illustrates possible locations of the RSRP Module 388, which may be part of the WWAN transceiver 350, the memory component 386, the processing system 384, or any combination thereof, or may be a standalone component. FIG. 3C illustrates possible locations of the RSRP Module 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the RSRP Modules 342, 388, and 398, etc.

Figure 4:
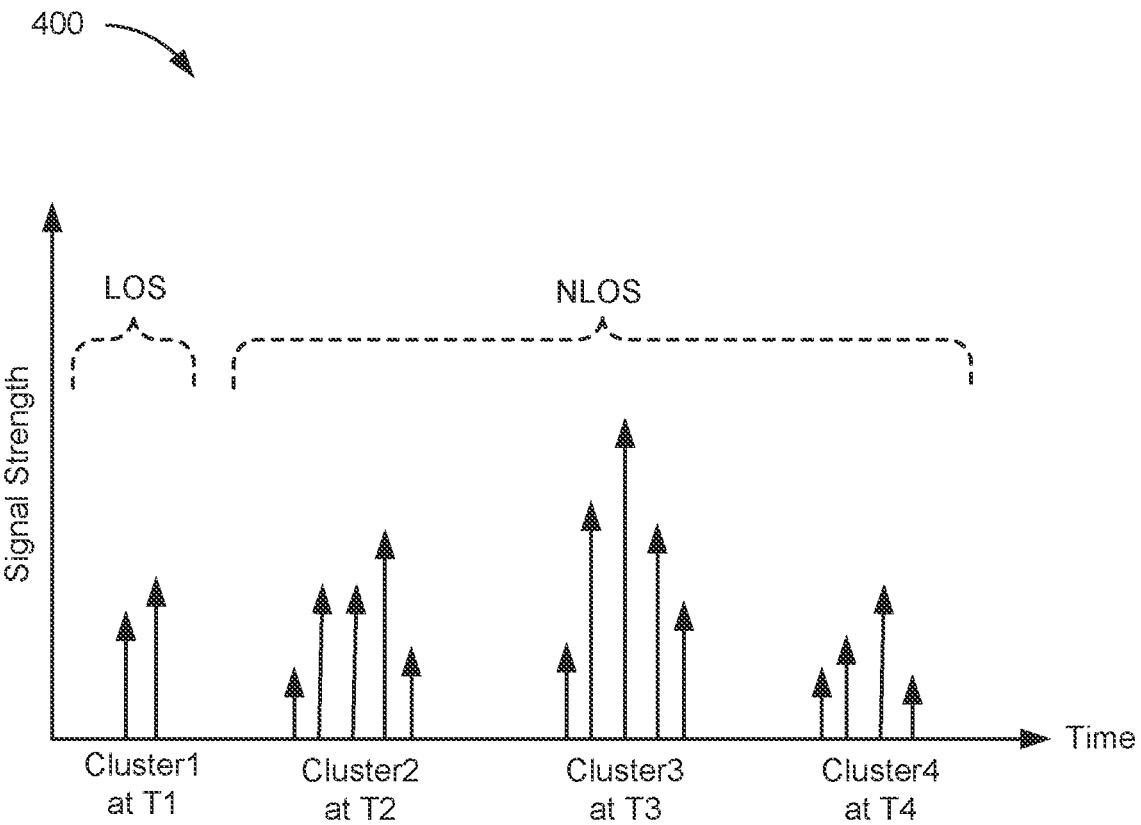
FIG. 4 is a graph showing a radio frequency (RF) channel impulse response over time, according to aspects of the disclosure.

FIG. 4 is a graph 400 illustrating the channel impulse response of a multipath channel between a receiver device (e.g., any of the UEs or base stations described herein) and a transmitter device (e.g., any other of the UEs or base stations described herein), according to aspects of the disclosure. The channel impulse response represents the intensity of a radio frequency (RF) signal received through a multipath channel as a function of time delay. Thus, the horizontal axis is in units of time (e.g., milliseconds) and the vertical axis is in units of signal strength (e.g., decibels). Note that a multipath channel is a channel between a transmitter and a receiver over which an RF signal follows multiple paths, or multipaths, due to transmission of the RF signal on multiple beams and/or to the propagation characteristics of the RF signal (e.g., reflection, refraction, etc.).

In the example of FIG. 4, the receiver detects/measures multiple (four) clusters of channel taps. Each channel tap represents a multipath that an RF signal followed between the transmitter and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (e.g., potentially following different paths due to reflections), or both.

All of the clusters of channel taps for a given RF signal represent the multipath channel (or simply channel) between the transmitter and receiver. Under the channel illustrated in FIG. 4, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 4, because the first cluster of RF signals at time T1 arrives first, it is assumed to correspond to the RF signal transmitted on the transmit beam aligned with the LOS, or the shortest, path. The third cluster at time T3 is comprised of the strongest RF signals, and may correspond to, for example, the RF signal transmitted on a transmit beam aligned with a non-line-of-sight (NLOS) path. Note that although FIG. 4 illustrates clusters of two to five channel taps, as will be appreciated, the clusters may have more or fewer than the illustrated number of channel taps.

Figure 5:
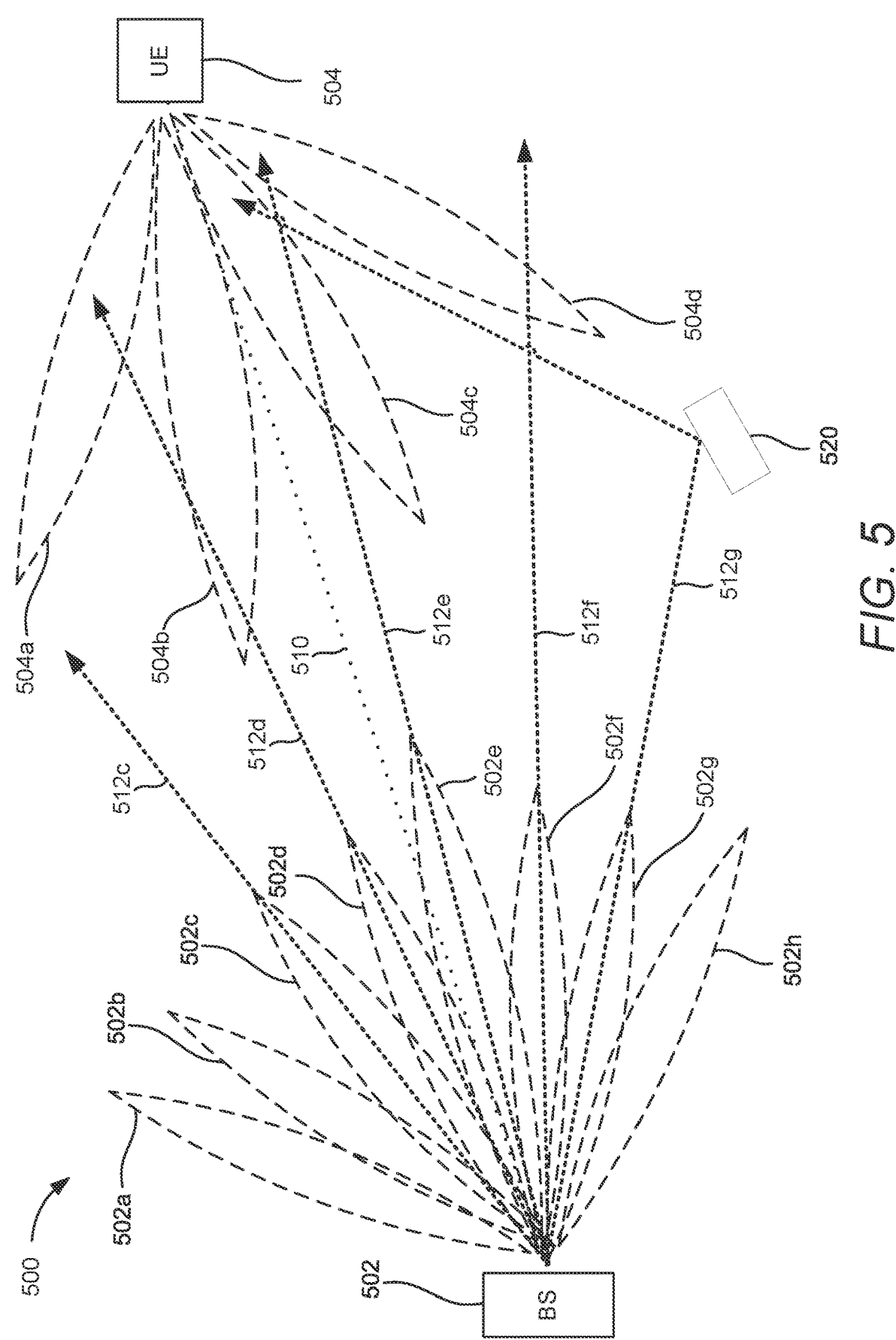
FIG. 5 is a diagram illustrating an example base station in communication with an example UE, according to aspects of the disclosure.

FIG. 5 is a diagram 500 illustrating a base station (BS) 502 (which may correspond to any of the base stations described herein) in communication with a UE 504 (which may correspond to any of the UEs described herein). Referring to FIG. 5, the base station 502 may transmit a beamformed signal to the UE 504 on one or more transmit beams 502a, 502b, 502c, 502d, 502e, 502f, 502g, 502h, each having a beam identifier that can be used by the UE 504 to identify the respective beam. Where the base station 502 is beamforming towards the UE 504 with a single array of antennas (e.g., a single TRP/cell), the base station 502 may perform a "beam sweep" by transmitting first beam 502a, then beam 502b, and so on until lastly transmitting beam 502h. Alternatively, the base station 502 may transmit beams 502a-502h in some pattern, such as beam 502a, then beam 502h, then beam 502b, then beam 502g, and so on. Where the base station 502 is beamforming towards the UE 504 using multiple arrays of antennas (e.g., multiple TRPs/cells), each antenna array may perform a beam sweep of a subset of the beams 502a-502h. Alternatively, each of beams 502a-502h may correspond to a single antenna or antenna array.

FIG. 5 further illustrates the paths 512c, 512d, 512e, 512f, and 512g followed by the beamformed signal transmitted on beams 502c, 502d, 502e, 502f, and 502g, respectively. Each path 512c, 512d, 512e, 512f, 512g may correspond to a single "multipath" or, due to the propagation characteristics of radio frequency (RF) signals through the environment, may be comprised of a plurality (a cluster) of "multipaths." Note that although only the paths for beams 502c-502g are shown, this is for simplicity, and the signal transmitted on each of beams 502a-502h will follow some path. In the example shown, the paths 512c, 512d, 512e, and 512f are straight lines, while path 512g reflects off an obstacle 520 (e.g., a building, vehicle, terrain feature, etc.).

The UE 504 may receive the beamformed signal from the base station 502 on one or more receive beams 504a, 504b, 504c, 504d. Note that for simplicity, the beams illustrated in FIG. 5 represent either transmit beams or receive beams, depending on which of the base station 502 and the UE 504 is transmitting and which is receiving. Thus, the UE 504 may also transmit a beamformed signal to the base station 502 on one or more of the beams 504a-504d, and the base station 502 may receive the beamformed signal from the UE 504 on one or more of the beams 502a-502h.

In an aspect, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502d and 504b, respectively, or beams 502e and 504c, respectively. The direction of the best transmit beam for the base station 502 may or may not be the same as the direction of the best receive beam, and likewise, the direction of the best receive beam for the UE 504 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 502 may transmit reference signals (e.g., PRS, CRS, TRS, CSI-RS, PSS, SSS, etc.) to the UE 504 on one or more of beams 502a-502h, with each beam having a different transmit angle. The different transmit angles of the beams will result in different received signal strengths (e.g., RSRP, RSRQ, SINR, etc.) at the UE 504. Specifically, the received signal strength will be lower for transmit beams 502a-502h that are further from the line of sight (LOS) path 510 between the base station 502 and the UE 504 than for transmit beams 502a-502h that are closer to the LOS path 510.

In the example of FIG. 5, if the base station 502 transmits reference signals to the UE 504 on beams 502c, 502d, 502e, 502f, and 502g, then transmit beam 502e is best aligned with the LOS path 510, while transmit beams 502c, 502d, 502f, and 502g are not. As such, beam 502e is likely to have a higher received signal strength at the UE 504 than beams 502c, 502d, 502f, and 502g. Note that the reference signals transmitted on some beams (e.g., beams 502c and/or 5020 may not reach the UE 504, or energy reaching the UE 504 from these beams may be so low that the energy may not be detectable or at least can be ignored.

The UE 504 can report the received signal strength, and optionally, the associated measurement quality, of each measured transmit beam 502c-502g to the base station 502, or alternatively, the identity of the transmit beam having the highest received signal strength (beam 502e in the example of FIG. 5). Alternatively or additionally, if the UE 504 is also engaged in a round-trip-time (RTT) or time-difference of arrival (TDOA) positioning session with at least one base station 502 or a plurality of base stations 502, respectively, the UE 504 can report reception-to-transmission (Rx-Tx) time difference or reference signal time difference (RSTD) measurements (and optionally the associated measurement qualities), respectively, to the serving base station 502 or other positioning entity. In any case, the positioning entity (e.g., the base station 502, a location server, a third-party client, UE 504, etc.) can estimate the angle from the base station 502 to the UE 504 as the AoD of the transmit beam having the highest received signal strength at the UE 504, here, transmit beam 502e.

In one aspect of DL-AoD-based positioning, where there is only one involved base station 502, the base station 502 and the UE 504 can perform a round-trip-time (RTT) procedure to determine the distance between the base station 502 and the UE 504. Thus, the positioning entity can determine both the direction to the UE 504 (using DL-AoD positioning) and the distance to the UE 504 (using RTT positioning) to estimate the location of the UE 504. Note that the AoD of the transmit beam having the highest received signal strength does not necessarily lie along the LOS path 510, as shown in FIG. 5. However, for DL-AoD-based positioning purposes, it is assumed to do so.

In another aspect of DL-AoD-based positioning, where there are multiple involved base stations 502, each involved base station 502 can report, to the serving base station 502, the determined AoD from the respective base station 502 to the UE 504, or the RSRP measurements. The serving base station 502 may then report the AoDs or RSRP measurements from the other involved base station(s) 502 to the positioning entity (e.g., UE 504 for UE-based positioning or a location server for UE-assisted positioning). With this information, and knowledge of the base stations' 502 geographic locations, the positioning entity can estimate a location of the UE 504 as the intersection of the determined AoDs. There should be at least two involved base stations 502 for a two-dimensional (2D) location solution, but as will be appreciated, the more base stations 502 that are involved in the positioning procedure, the more accurate the estimated location of the UE 504 will be.

To perform an UL-AoA positioning procedure, the UE 504 transmits uplink reference signals (e.g., UL-PRS, SRS, DMRS, etc.) to the base station 502 on one or more of uplink transmit beams 504a-504d. The base station 502 receives the uplink reference signals on one or more of uplink receive beams 502a-502h. The base station 502 determines the angle of the best receive beams 502a-502h used to receive the one or more reference signals from the UE 504 as the AoA from the UE 504 to itself. Specifically, each of the receive beams 502a-502h will result in a different received signal strength (e.g., RSRP, RSRQ, SINR, etc.) of the one or more reference signals at the base station 502. Further, the channel impulse response of the one or more reference signals will be smaller for receive beams 502a-502h that are further from the actual LOS path between the base station 502 and the UE 504 than for receive beams 502a-502h that are closer to the LOS path. Likewise, the received signal strength will be lower for receive beams 502a-502h that are further from the LOS path than for receive beams 502a-502h that are closer to the LOS path. As such, the base station 502 identifies the receive beam 502a-502h that results in the highest received signal strength and, optionally, the strongest channel impulse response, and estimates the angle from itself to the UE 504 as the AoA of that receive beam 502a-502h. Note that as with DL-AoD-based positioning, the AoA of the receive beam 502a-502h resulting in the highest received signal strength (and strongest channel impulse response if measured) does not necessarily lie along the LOS path 510. However, for UL-AoA-based positioning purposes in FR2, it may be assumed to do so.

Note that while the UE 504 is illustrated as being capable of beamforming, this is not necessary for DL-AoD and UL-AoA positioning procedures. Rather, the UE 504 may receive and transmit on an omni-directional antenna.

Where the UE 504 is estimating its location (i.e., the UE is the positioning entity), it needs to obtain the geographic location of the base station 502. The UE 504 may obtain the location from, for example, the base station 502 itself or a location server (e.g., location server 230, LMF 270, SLP 272). With the knowledge of the distance to the base station 502 (based on the RTT or timing advance), the angle between the base station 502 and the UE 504 (based on the UL-AoA of the best receive beam 502a-502h), and the known geographic location of the base station 502, the UE 504 can estimate its location.

Alternatively, where a positioning entity, such as the base station 502 or a location server, is estimating the location of the UE 504, the base station 502 reports the AoA of the receive beam 502a-502h resulting in the highest received signal strength (and optionally strongest channel impulse response) of the reference signals received from the UE 504, or all received signal strengths and channel impulse responses for all receive beams 502 (which allows the positioning entity to determine the best receive beam 502a-502h). The base station 502 may additionally report the Rx-Tx time difference to the UE 504. The positioning entity can then estimate the location of the UE 504 based on the UE's 504 distance to the base station 502, the AoA of the identified receive beam 502a-502h, and the known geographic location of the base station 502.

One aspect in Rel-17 3GPP DL-AoD (and UL-AoA) estimation for positioning is the measurement of the RSRP of the first (or earliest) arrival path. Aspects such as how to indicate the earliest path arrival time, reporting of additional path(s) to the first (or earliest) path, mechanisms to support PRS-RSRP per path among OTDOA, UL-TDOA, etc. have been considered. However, there is at present no consistent definition for how the RSRP is measured.

Figure 6:
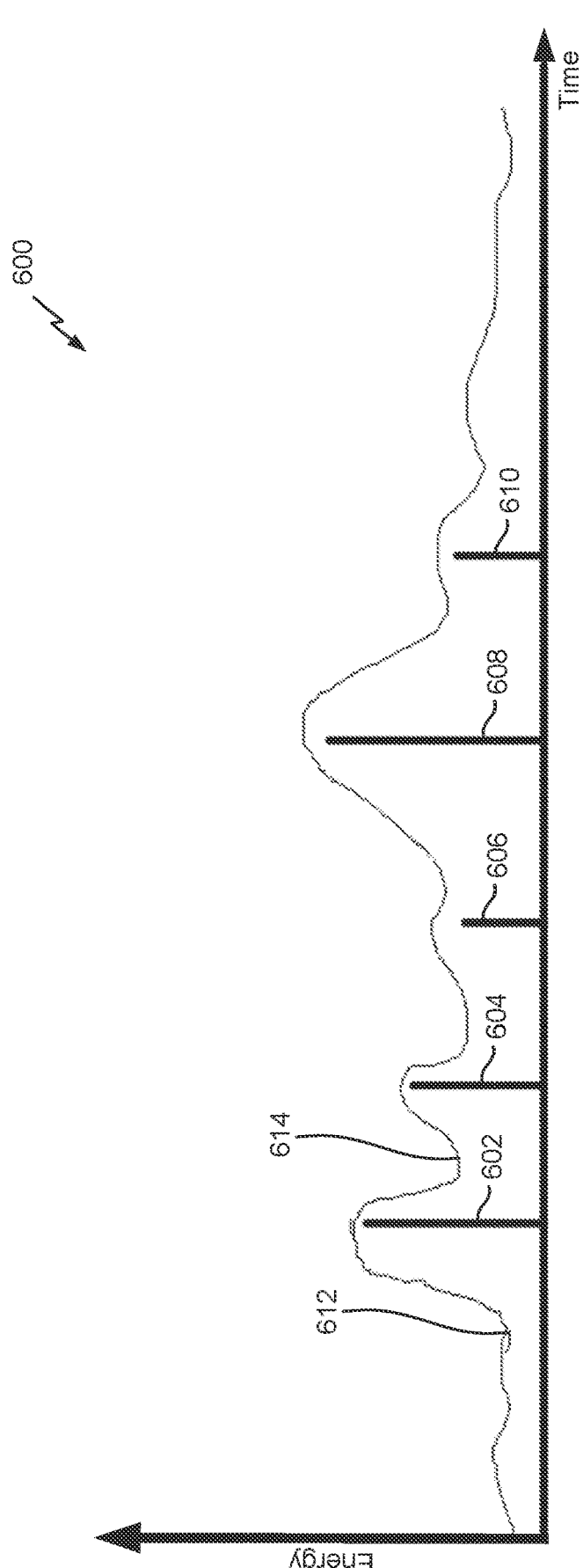
FIG. 6 illustrates a channel impulse response (CIR) (or alternatively, channel energy response (CER)) for a reference signal for positioning (RS-P) in the time domain obtained after performing an Inverse Fast Fourier Transform (IFFT) of the channel frequency response (CFR) in accordance with an aspect of the disclosure.

FIG. 6 illustrates a channel impulse response (CIR) 600 (or alternatively, channel energy response (CER)) for a reference signal for positioning (RS-P) in the time domain obtained after performing an Inverse Fast Fourier Transform (IFFT) of the channel frequency response (CFR) in accordance with an aspect of the disclosure. The CIR 600 may be associated with a particular antenna pair, bandwidth (BW), etc. used to measure the RS-P. In FIG. 6, the x-axis depicts time, and the y-axis depicts energy (or channel impulse). The RS-P in FIG. 6 may correspond to a DL-PRS (e.g., from gNB to UE), an uplink SRS for positioning (UL-SRS-P) (e.g., from UE to gNB or sidelink UE), or a sidelink SRS-P (SL-SRS-P) (e.g., from an anchor or reference UE to sidelink UE).

Referring to FIG. 6, the channel response 600 includes five peaks which are correlated with samples at 602, 604, 606, 608 and 610. The sample at 602 corresponds to the peak of the earliest path. There are also a number of energy valleys arranged before, between or after the peaks of the respective paths. In particular, energy valley 612 is the first energy valley preceding the sample 602 of the peak of the earliest path, and energy valley 614 is the first energy valley following the sample 602 of the peak of the earliest path. As used herein, the sample of a peak may be used interchangeably with the peak itself, even though the sample may not perfectly align with the absolute high-point of maximum of the respective peak.

With respect to FIG. 6, in some systems, RSRP is measured based on samples taken across all of the paths 602-610. In this case, the energy from different paths can only be resolved if the path spacing is proportionally larger than the inverse of the bandwidth (BW).

Aspects of the disclosure relate to various methodologies for measuring the RSRP of an RS-P. In particular, the RSRP may be measured specifically with respect to a peak of the earliest path of the RS-P, which is more relevant for UE positioning than other paths (e.g., even if the other path(s) have a strong channel impulse or energy). Such aspects may provide various technical advantages, such as improved RSRP measurements which may in turn improve the accuracy of UL-AoA and/or DL-AoD measurements, which may in turn improve the accuracy of UE positioning.

Figure 7:
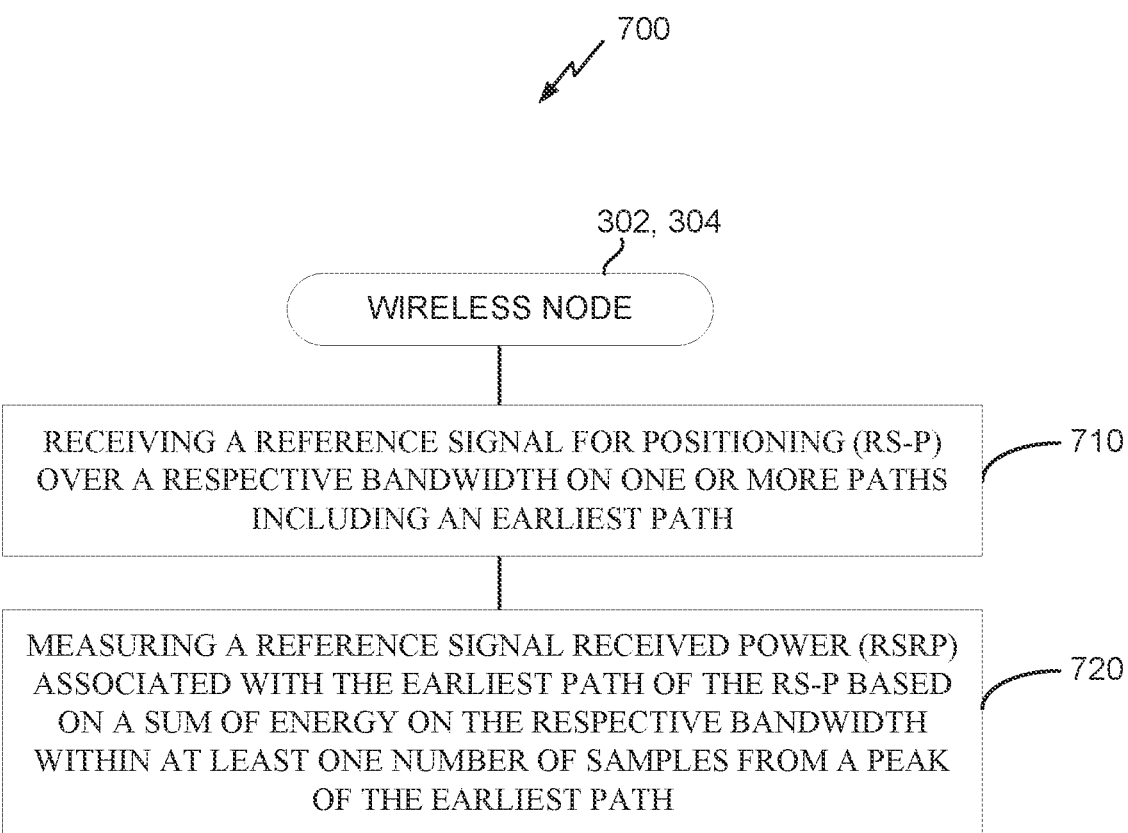
FIG. 7 illustrates an exemplary process of wireless communications according to an aspect of the disclosure.

FIG. 7 illustrates an exemplary process 700 of wireless communications according to an aspect of the disclosure. The process 700 of FIG. 7 is performed by a wireless node, which may correspond to a UE such as UE 302 (e.g., which may measure RSRP of DL-PRS from gNB or sidelink SRS-P (SL-SRS-P) from another UE), or gNB such as BS 304 (e.g., which may measure RSRP of UL-SRS-P).

Referring to FIG. 7, at 710, the wireless node (e.g., receiver 312 or 322 or 352 or 362) receives an RS-P over a respective bandwidth on one or more paths including an earliest path. In some designs, a means for performing the reception of 710 may include receiver 312 or 322 or 352 or 362, etc., depending on whether the wireless node corresponds to UE 302 or BS 304.

Referring to FIG. 7, at 720, the wireless node (e.g., processing system 332 or 384, RSRP Module 342 or 388, etc.) measures an RSRP associated with the earliest path of the RS-P based on a sum of energy on the respective bandwidth within at least one number of samples from a peak of the earliest path. As will be described below in more detail, the number(s) of samples that contribute to the sum of energy for the RSRP measurement can be determined in a variety of ways. In some designs, a means for measurement of 720 may include processing system 332 or 384, RSRP Module 342 or 388, etc., depending on whether the wireless node corresponds to UE 302 or BS 304.

Referring to FIG. 7, in some designs, the at least one number of samples includes a single number of samples, such that the RSRP is measured based on the sum of energy of the same number of samples on both sides of the peak of the earliest path. For example, the sum of energy may be taken across the first N samples on both sides of the first (or earliest) path. In some designs, value of "N" is a function of the BW and the oversampling factor used to compute the IFFT. For example, N may be increased as the oversampling factor is increased (e.g., higher oversampling means more samples across a given period of time). In some designs, N may be equal to zero (i.e., N=0). In this case, the sum of energy for the RSRP measurement includes energy of a sample associated with the peak of the earliest path only (e.g., the rest of the sinc function spillover is ignored).

Figure 8:
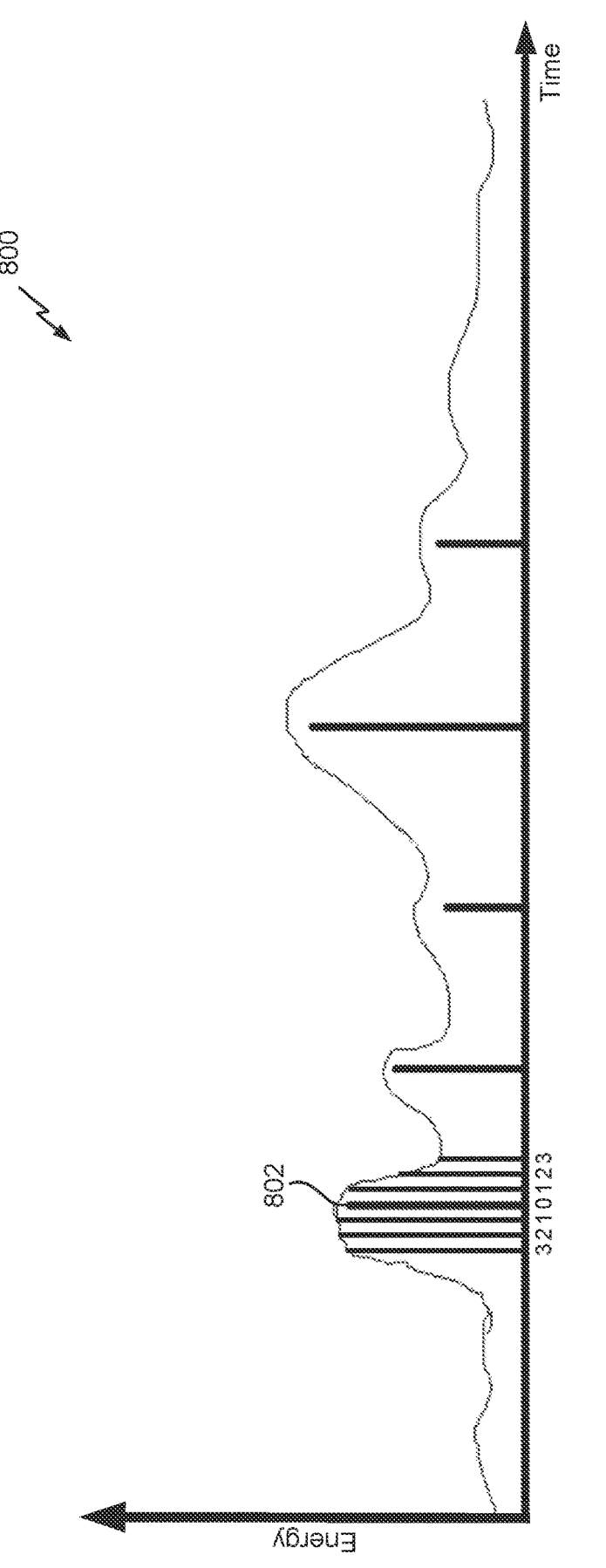
FIG. 8 illustrates a CIR (or alternatively, CER) for a RS-P in the time domain obtained after performing an IFFT of the CFR in accordance with another aspect of the disclosure.

FIG. 8 illustrates a CIR 800 (or alternatively, CER) for a RS-P in the time domain obtained after performing an IFFT of the CFR in accordance with another aspect of the disclosure. The CIR 800 is the same as the CIR 600 of FIG. 6, except FIG. 8 depicts a scenario where N=3 such that the energy for the RSRP measurement at 720 of FIG. 7 is summed across the peak sample 802, three (3) samples preceding peak sample 802, and three (3) samples following the peak sample 802.

Referring to FIG. 7, in some designs, the value of N may be determined in a variety of ways. For example, as noted above, the single number of samples (i.e., N) is derived as a function of the respective bandwidth and an oversampling factor used to compute an IFFR samples of the RS-P. In a specific example, BW=100 MHz, oversampling=4, spacing=2.5 ns, and N=3. However, N can be varied (up or down) in accordance with some or all of these parameters. In other designs, a time threshold may be defined (e.g., X ns) relative to the peak of the earliest path, and the RSRP is measured based on the sum of energy of any sample that falls inside of the time threshold on either side of the peak of the earliest path. In this case, N is determined as a number of samples that can fit inside of the time threshold (X ns) on both sides of the peak of the earliest path. In some designs, the time threshold is based on the respective bandwidth (e.g., dynamically determined at the wireless node). In other designs, the time threshold may be a network-configured parameter.

Referring to FIG. 7, in some designs, at least one number of samples includes a first number of samples preceding the peak of the earliest path and a second number of samples following the peak of the earliest path, the first and second numbers of samples being different. In other words, in contrast to FIG. 8, the samples contributing to the RSRP measurement need not be equivalent on both sides of the peak 802 of the earliest path.

Figure 9:
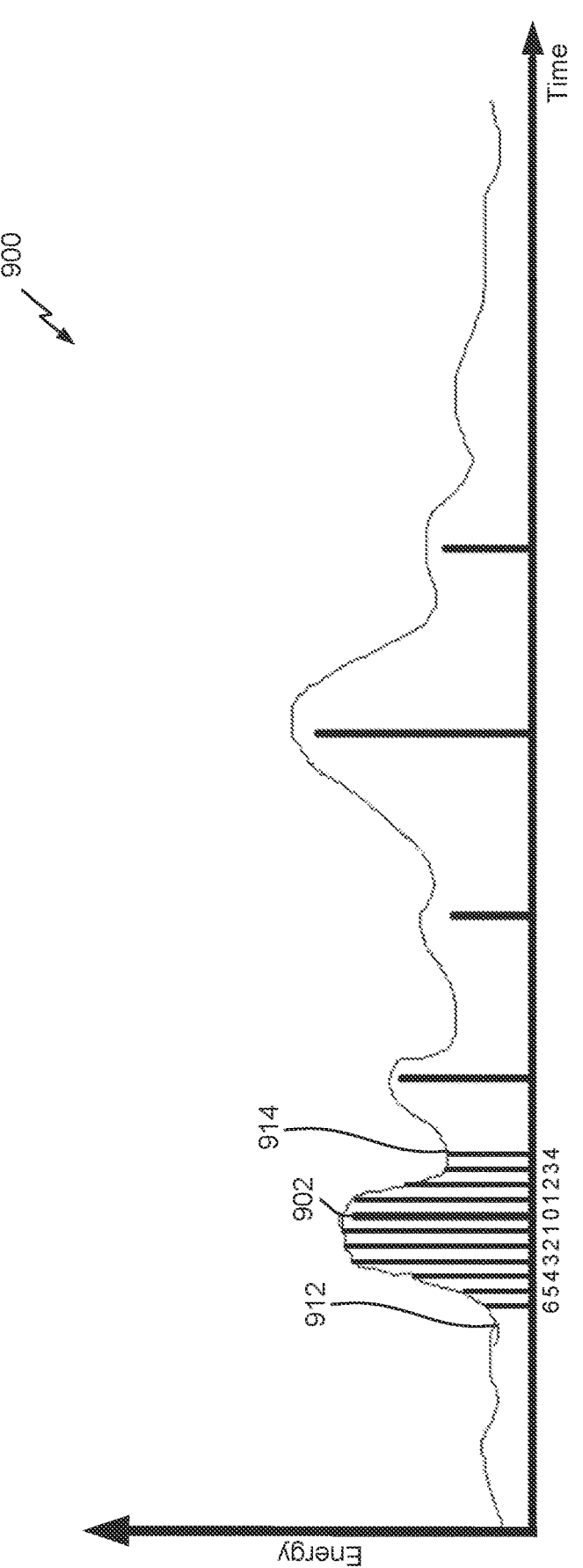
FIG. 9 illustrates a CIR (or alternatively, CER) for a RS-P in the time domain obtained after performing an IFFT of the CFR in accordance with another aspect of the disclosure.

FIG. 9 illustrates a CIR 900 (or alternatively, CER) for a RS-P in the time domain obtained after performing an IFFT of the CFR in accordance with another aspect of the disclosure. The CIR 900 is the same as the CIR 600 of FIG. 6, except FIG. 9 depicts a scenario the energy for the RSRP measurement at 720 of FIG. 7 is summed across peak sample 902, six (6) samples preceding the peak sample 902, and four (4) samples following the peak sample 902.

Referring to FIG. 7, in some designs, the first number of samples may include one or more samples from the peak of the earliest path to a first energy valley preceding the peak of the earliest path, and the second number of samples may include at least one sample from the peak of the earliest path to a first energy valley following the peak of the earliest path. This aspect is depicted in FIG. 9 with respect to energy valleys 912 and 914.

Figure 10:
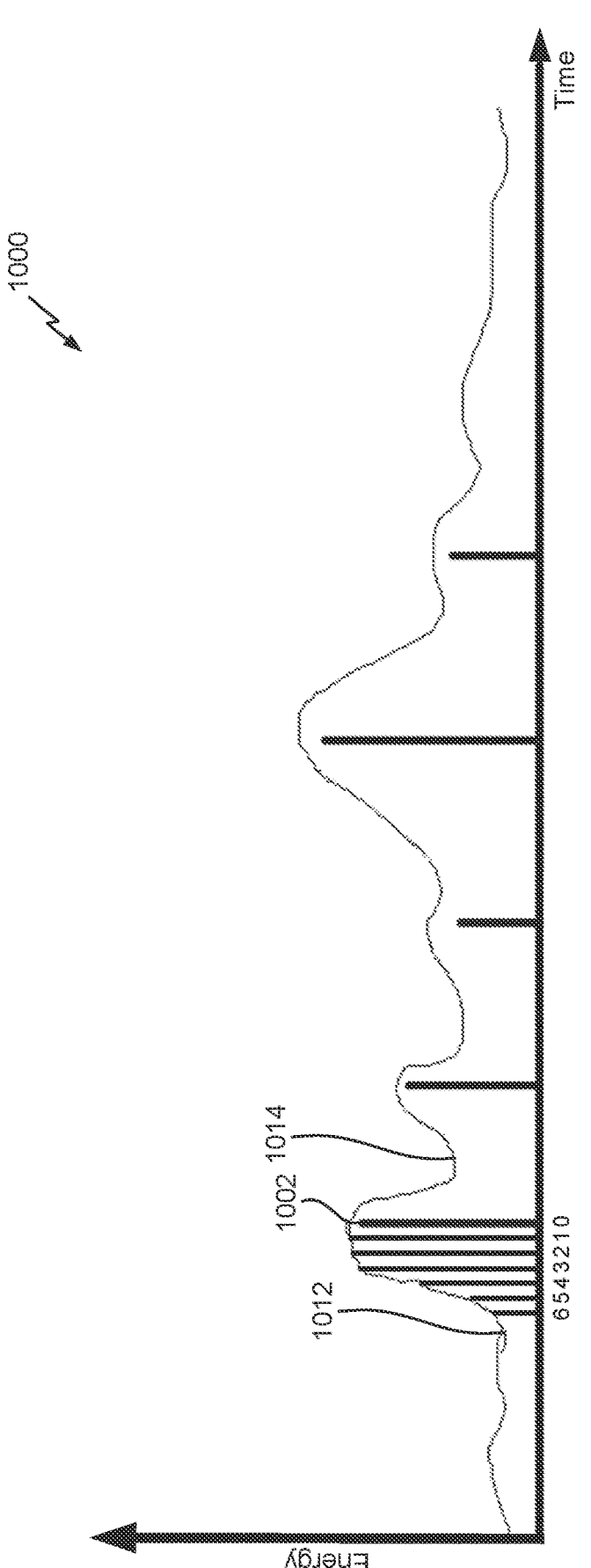
FIG. 10 illustrates a CIR (or alternatively, CER) for a RS-P in the time domain obtained after performing an IFFT of the CFR in accordance with another aspect of the disclosure.

Referring to FIG. 7, in some designs, a first energy valley (912) preceding the peak (902) of the earliest path is associated with a first energy, a first energy valley (914) following the peak (902) of the earliest path is associated with a second energy, and the RSRP is measured based on the sum of energy of one or more samples only on a side of the peak of the earliest path that is associated with a lower of the first and second energies. For example, the side of the peak (902) that has a higher energy in a first energy valley is likely being impacted by one or more multipath signals, such that the side with the lower energy can be designated for the RSRP measurement, as shown in FIG. 10. In some designs, if only one side of the peak is used to derive the RSRP measurement, then the energy of the non-peak samples may be scaled by 2 (i.e., 2× scaled) since only one direction (from peak) is counted.

Referring to FIG. 7, in some designs, a first energy valley (912) preceding the peak (902) of the earliest path is a first number of samples to the peak of the earliest path, a first energy valley following the peak of the earliest path is a second number of samples to the peak of the earliest path, and the RSRP is measured based on the sum of energy of one or more samples only on a side of the peak of the earliest path that is associated with a lower of the first and second numbers of samples to the peak of the earliest path, as shown in FIG. 10. For example, for the LOS or earliest path, the left side of the peak will typically have the lower number of samples to the nearest energy valley, while either side may have the lower number of samples to the nearest energy valley with respect to other peaks. In some designs, if only one side of the peak is used to derive the RSRP measurement, then the energy of the non-peak samples may be scaled by 2 (i.e., 2× scaled) since only one direction (from peak) is counted.

FIG. 10 illustrates a CIR 1000 (or alternatively, CER) for a RS-P in the time domain obtained after performing an IFFT of the CFR in accordance with another aspect of the disclosure. The CIR 1000 is the same as the CIR 600 of FIG. 6, except FIG. 10 depicts a scenario the energy for the RSRP measurement at 720 of FIG. 7 is summed across peak sample 1002, and six (6) samples preceding the peak sample 1002. Energy valleys 1012 and 1014 are depicted in FIG. 10.

Referring to FIG. 7, in some designs, if multiple antennas are used to measure the RS-P, then the process of FIG. 7 can be implemented on each observed CIR and then averaged across all the antenna pairs. In other designs, the max RSRP can be measured on each antenna pair (e.g., rather than averaging). In some designs, the overall RSRP is computed in frequency domain typically in implementation. To compute the RSRP of each path, the overall fraction of energy of the desired path may be computed and then scaled by the RSRP measured to report to the network.

In some designs, the wireless node may report the RSRP to an external entity. In some designs, the RSRP for the earliest path as described with respect to FIG. 7 may be reported in lieu of, or alternatively in addition to, a legacy RSRP measurement (e.g., based on samples associated with multiple paths rather than the earliest path specifically). In some designs, the wireless node may report (e.g., to gNB, LMF, etc.) a capability of the wireless node to perform earliest-path RSRP measurements as described with respect to FIG. 7.

Referring to FIG. 7, in some designs as noted above, the wireless node may correspond to a UE or a base station. Likewise, the RS-P corresponds to an uplink sounding reference signal for positioning (UL-SRS-P), a downlink positioning reference signal (DL-PRS), or a sidelink SRS-P (SL-SRS-P).

Referring to FIG. 7, in some designs, the at least one number of samples or a parameter used by the wireless node to derive the at least one number of samples is network-configured (e.g., by gNB and/or LMF).

Referring to FIG. 7, in some designs, the wireless node may derive an angular measurement (e.g., DL-AoD, UL-AoA, etc.) based on the RSRP measured at 720 of FIG. 7. In some designs, the wireless node may report the derived angular measurement to an external entity (e.g., a position estimation entity, such as a UE for UE-based positioning, or an LMF integrated at RAN or core network, a location server, etc.). In other designs, the wireless node may determine a positioning estimate of a UE based on the derived angular measurement (e.g., in case where the wireless node corresponds to the position estimation entity).

Referring to FIG. 7, in some designs, the number of sample(s) and/or parameter(s) used to derive the number of sample(s) to use for the RSRP measurement at 720 of FIG. 7 can be determined based on a test procedure. For example, a 2(P)-path channel with taps spaced at X ns and with a BW of B MHz can be created. The phase of the two paths and the delay between the two paths can be varied in the test. The reported RSRP should be within the specified value (with a tolerance).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a wireless node, comprising: receiving a reference signal for positioning (RS-P) over a respective bandwidth on one or more paths including an earliest path; and measuring a reference signal received power (RSRP) associated with the earliest path of the RS-P based on a sum of energy on the respective bandwidth within at least one number of samples from a peak of the earliest path.

Clause 2. The method of clause 1, wherein the at least one number of samples includes a single number of samples, such that the RSRP is measured based on the sum of energy of the same number of samples on both sides of the peak of the earliest path.

Clause 3. The method of clause 2, wherein the single number of samples is derived as a function of the respective bandwidth and an oversampling factor used to compute an Inverse Fast Fourier Transform (IFFT) samples of the RS-P.

Clause 4. The method of any of clauses 2 to 3, wherein the single number of samples is zero, and wherein the sum of energy includes energy of a sample associated with the peak of the earliest path only.

Clause 5. The method of any of clauses 2 to 4, wherein a time threshold is defined relative to the peak of the earliest path, and wherein the RSRP is measured based on the sum of energy of any sample that falls inside of the time threshold on either side of the peak of the earliest path.

Clause 6. The method of clause 5, wherein the time threshold is based on the respective bandwidth, or wherein the time threshold is a network-configured parameter.

Clause 7. The method of any of clauses 1 to 6, wherein the at least one number of samples comprises a first number of samples preceding the peak of the earliest path and a second number of samples following the peak of the earliest path, the first and second numbers of samples being different.

Clause 8. The method of clause 7, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

Clause 9. The method of any of clauses 1 to 8, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

Clause 10. The method of any of clauses 1 to 9, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

Clause 11. The method of any of clauses 1 to 10, wherein the RSRP is measured per antenna pair, or wherein the RSRP is measured as an average RSRP across multiple antenna pairs.

Clause 12. The method of any of clauses 1 to 11, wherein the wireless node corresponds to a user equipment (UE) or a base station.

Clause 13. The method of any of clauses 1 to 12, wherein the RS-P corresponds to an uplink sounding reference signal for positioning (UL-SRS-P), a downlink positioning reference signal (DL-PRS), or a sidelink SRS-P (SL-SRS-P).

Clause 14. The method of any of clauses 1 to 13, wherein the at least one number of samples or a parameter used by the wireless node to derive the at least one number of samples is network-configured.

Clause 15. The method of any of clauses 1 to 14, further comprising: reporting the RSRP to an external entity.

Clause 16. The method of clause 15, further comprising: reporting another RSRP measurement that is based upon a sum of energy across multiple paths of the RS-P.

Clause 17. The method of any of clauses 1 to 16, further comprising: deriving an angular measurement based on the RSRP.

Clause 18. The method of clause 17, further comprising: reporting the derived angular measurement to an external entity.

Clause 19. The method of any of clauses 17 to 18, further comprising: determining a positioning estimate of a user equipment (UE) based on the derived angular measurement.

Clause 20. The method of any of clauses 17 to 19, wherein the angular measurement comprises a downlink angle of departure (DL-AoD) measurement or an uplink angular of arrival (UL-AoA) measurement.

Clause 21. A wireless node, comprising: a memory; at least one transceiver; and at least one processor communicatively coupled to the memory and the at least one transceiver, the at least one processor configured to: receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

Clause 22. The wireless node of clause 21, wherein the at least one number of samples includes a single number of samples, such that the RSRP is measured based on the sum of energy of the same number of samples on both sides of the peak of the earliest path.

Clause 23. The wireless node of clause 22, wherein the single number of samples is derived as a function of the respective bandwidth and an oversampling factor used to compute an Inverse Fast Fourier Transform (IFFT) samples of the RS-P.

Clause 24. The wireless node of clause 22, wherein the single number of samples is zero, and wherein the sum of energy includes energy of a sample associated with the peak of the earliest path only.

Clause 25. The wireless node of clause 22, wherein a time threshold is defined relative to the peak of the earliest path, and wherein the RSRP is measured based on the sum of energy of any sample that falls inside of the time threshold on either side of the peak of the earliest path.

Clause 26. The wireless node of clause 25, wherein the time threshold is based on the respective bandwidth, or wherein the time threshold is a network-configured parameter.

Clause 27. The wireless node of any of clauses 21 to 26, wherein the at least one number of samples comprises a first number of samples preceding the peak of the earliest path and a second number of samples following the peak of the earliest path, the first and second numbers of samples being different.

Clause 28. The wireless node of clause 27, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

Clause 29. The wireless node of any of clauses 21 to 28, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

Clause 30. The wireless node of any of clauses 21 to 29, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

Clause 31. The wireless node of any of clauses 21 to 30, wherein the RSRP is measured per antenna pair, or wherein the RSRP is measured as an average RSRP across multiple antenna pairs.

Clause 32. The wireless node of any of clauses 21 to 31, wherein the wireless node corresponds to a user equipment (UE) or a base station.

Clause 33. The wireless node of any of clauses 21 to 32, wherein the RS-P corresponds to an uplink sounding reference signal for positioning (UL-SRS-P), a downlink positioning reference signal (DL-PRS), or a sidelink SRS-P (SL-SRS-P).

Clause 34. The wireless node of any of clauses 21 to 33, wherein the at least one number of samples or a parameter used by the wireless node to derive the at least one number of samples is network-configured.

Clause 35. The wireless node of any of clauses 21 to 34, wherein the at least one processor is further configured to: report the RSRP to an external entity.

Clause 36. The wireless node of clause 35, wherein the at least one processor is further configured to: report another RSRP measurement that is based upon a sum of energy across multiple paths of the RS-P.

Clause 37. The wireless node of any of clauses 21 to 36, wherein the at least one processor is further configured to: derive an angular measurement based on the RSRP.

Clause 38. The wireless node of clause 37, wherein the at least one processor is further configured to: report the derived angular measurement to an external entity.

Clause 39. The wireless node of any of clauses 37 to 38, wherein the at least one processor is further configured to: determine a positioning estimate of a user equipment (UE) based on the derived angular measurement.

Clause 40. The wireless node of any of clauses 37 to 39, wherein the angular measurement comprises a downlink angle of departure (DL-AoD) measurement or an uplink angular of arrival (UL-AoA) measurement.

Clause 41. A wireless node, comprising: means for receiving a reference signal for positioning (RS-P) over a respective bandwidth on one or more paths including an earliest path; and means for measuring a reference signal received power (RSRP) associated with the earliest path of the RS-P based on a sum of energy on the respective bandwidth within at least one number of samples from a peak of the earliest path.

Clause 42. The wireless node of clause 41, wherein the at least one number of samples includes a single number of samples, such that the RSRP is measured based on the sum of energy of the same number of samples on both sides of the peak of the earliest path.

Clause 43. The wireless node of clause 42, wherein the single number of samples is derived as a function of the respective bandwidth and an oversampling factor used to compute an Inverse Fast Fourier Transform (IFFT) samples of the RS-P.

Clause 44. The wireless node of any of clauses 42 to 43, wherein the single number of samples is zero, and wherein the sum of energy includes energy of a sample associated with the peak of the earliest path only.

Clause 45. The wireless node of any of clauses 42 to 44, wherein a time threshold is defined relative to the peak of the earliest path, and wherein the RSRP is measured based on the sum of energy of any sample that falls inside of the time threshold on either side of the peak of the earliest path.

Clause 46. The wireless node of clause 45, wherein the time threshold is based on the respective bandwidth, or wherein the time threshold is a network-configured parameter.

Clause 47. The wireless node of any of clauses 41 to 46, wherein the at least one number of samples comprises a first number of samples preceding the peak of the earliest path and a second number of samples following the peak of the earliest path, the first and second numbers of samples being different.

Clause 48. The wireless node of clause 47, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

Clause 49. The wireless node of any of clauses 41 to 48, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

Clause 50. The wireless node of any of clauses 41 to 49, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

Clause 51. The wireless node of any of clauses 41 to 50, wherein the RSRP is measured per antenna pair, or wherein the RSRP is measured as an average RSRP across multiple antenna pairs.

Clause 52. The wireless node of any of clauses 41 to 51, wherein the wireless node corresponds to a user equipment (UE) or a base station.

Clause 53. The wireless node of any of clauses 41 to 52, wherein the RS-P corresponds to an uplink sounding reference signal for positioning (UL-SRS-P), a downlink positioning reference signal (DL-PRS), or a sidelink SRS-P (SL-SRS-P).

Clause 54. The wireless node of any of clauses 41 to 53, wherein the at least one number of samples or a parameter used by the wireless node to derive the at least one number of samples is network-configured.

Clause 55. The wireless node of any of clauses 41 to 54, further comprising: means for reporting the RSRP to an external entity.

Clause 56. The wireless node of clause 55, further comprising: means for reporting another RSRP measurement that is based upon a sum of energy across multiple paths of the RS-P.

Clause 57. The wireless node of any of clauses 41 to 56, further comprising: means for deriving an angular measurement based on the RSRP.

Clause 58. The wireless node of clause 57, further comprising: means for reporting the derived angular measurement to an external entity.

Clause 59. The wireless node of any of clauses 57 to 58, further comprising: means for determining a positioning estimate of a user equipment (UE) based on the derived angular measurement.

Clause 60. The wireless node of any of clauses 57 to 59, wherein the angular measurement comprises a downlink angle of departure (DL-AoD) measurement or an uplink angular of arrival (UL-AoA) measurement.

Clause 61. A non-transitory computer-readable medium storing a set of instructions, the set of instructions comprising one or more instructions that, when executed by one or more processors of a wireless node, cause the wireless node to: receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

Clause 62. The non-transitory computer-readable medium of clause 61, wherein the at least one number of samples includes a single number of samples, such that the RSRP is measured based on the sum of energy of the same number of samples on both sides of the peak of the earliest path.

Clause 63. The non-transitory computer-readable medium of clause 62, wherein the single number of samples is derived as a function of the respective bandwidth and an oversampling factor used to compute an Inverse Fast Fourier Transform (IFFT) samples of the RS-P.

Clause 64. The non-transitory computer-readable medium of any of clauses 62 to 63, wherein the single number of samples is zero, and wherein the sum of energy includes energy of a sample associated with the peak of the earliest path only.

Clause 65. The non-transitory computer-readable medium of any of clauses 62 to 64, wherein a time threshold is defined relative to the peak of the earliest path, and wherein the RSRP is measured based on the sum of energy of any sample that falls inside of the time threshold on either side of the peak of the earliest path.

Clause 66. The non-transitory computer-readable medium of clause 65, wherein the time threshold is based on the respective bandwidth, or wherein the time threshold is a network-configured parameter.

Clause 67. The non-transitory computer-readable medium of any of clauses 61 to 66, wherein the at least one number of samples comprises a first number of samples preceding the peak of the earliest path and a second number of samples following the peak of the earliest path, the first and second numbers of samples being different.

Clause 68. The non-transitory computer-readable medium of clause 67, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

Clause 69. The non-transitory computer-readable medium of any of clauses 61 to 68, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

Clause 70. The non-transitory computer-readable medium of any of clauses 61 to 69, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

Clause 71. The non-transitory computer-readable medium of any of clauses 61 to 70, wherein the RSRP is measured per antenna pair, or wherein the RSRP is measured as an average RSRP across multiple antenna pairs.

Clause 72. The non-transitory computer-readable medium of any of clauses 61 to 71, wherein the wireless node corresponds to a user equipment (UE) or a base station.

Clause 73. The non-transitory computer-readable medium of any of clauses 61 to 72, wherein the RS-P corresponds to an uplink sounding reference signal for positioning (UL-SRS-P), a downlink positioning reference signal (DL-PRS), or a sidelink SRS-P (SL-SRS-P).

Clause 74. The non-transitory computer-readable medium of any of clauses 61 to 73, wherein the at least one number of samples or a parameter used by the wireless node to derive the at least one number of samples is network-configured.

Clause 75. The non-transitory computer-readable medium of any of clauses 61 to 74, wherein the one or more instructions further cause the wireless node to: report the RSRP to an external entity.

Clause 76. The non-transitory computer-readable medium of clause 75, wherein the one or more instructions further cause the wireless node to: report another RSRP measurement that is based upon a sum of energy across multiple paths of the RS-P.

Clause 77. The non-transitory computer-readable medium of any of clauses 61 to 76, wherein the one or more instructions further cause the wireless node to: derive an angular measurement based on the RSRP.

Clause 78. The non-transitory computer-readable medium of clause 77, wherein the one or more instructions further cause the wireless node to: report the derived angular measurement to an external entity.

Clause 79. The non-transitory computer-readable medium of any of clauses 77 to 78, wherein the one or more instructions further cause the wireless node to: determine a positioning estimate of a user equipment (UE) based on the derived angular measurement.

Clause 80. The non-transitory computer-readable medium of any of clauses 77 to 79, wherein the angular measurement comprises a downlink angle of departure (DL-AoD) measurement or an uplink angular of arrival (UL-AoA) measurement.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data mag-netically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is con-templated unless limitation to the singular is explicitly stated.

What is claimed is:

1. A method of operating a wireless node, comprising:
receiving a reference signal for positioning (RS-P) over a respective bandwidth on one or more paths including an earliest path; and
measuring a reference signal received power (RSRP) associated with the earliest path of the RS-P based on a sum of energy on the respective bandwidth within at least one number of samples from a peak of the earliest path.

2. The method of claim 1, wherein the at least one number of samples includes a single number of samples, such that the RSRP is measured based on the sum of energy of the same number of samples on both sides of the peak of the earliest path.

3. The method of claim 2, wherein the single number of samples is derived as a function of the respective bandwidth and an oversampling factor used to compute an Inverse Fast Fourier Transform (IFFT) samples of the RS-P.

4. The method of claim 2,
wherein the single number of samples is zero, and
wherein the sum of energy includes energy of a sample associated with the peak of the earliest path only.

5. The method of claim 2,
wherein a time threshold is defined relative to the peak of the earliest path, and
wherein the RSRP is measured based on the sum of energy of any sample that falls inside of the time threshold on either side of the peak of the earliest path.

6. The method of claim 5,
wherein the time threshold is based on the respective bandwidth, or
wherein the time threshold is a network-configured parameter.

7. The method of claim 1, wherein the at least one number of samples comprises a first number of samples preceding the peak of the earliest path and a second number of samples following the peak of the earliest path, the first and second numbers of samples being different.

8. The method of claim 7,
wherein the first number of samples comprises one or more samples from the peak of the earliest path to a first energy valley preceding the peak of the earliest path, and
wherein the second number of samples comprises at least one sample from the peak of the earliest path to a first energy valley following the peak of the earliest path.

9. The method of claim 1,
wherein a first energy valley preceding the peak of the earliest path is associated with a first energy,
wherein a first energy valley following the peak of the earliest path is associated with a second energy, and
wherein the RSRP is measured based on the sum of energy of one or more samples only on a side of the peak of the earliest path that is associated with a lower of the first and second energies.

10. The method of claim 1,
wherein a first energy valley preceding the peak of the earliest path is a first number of samples to the peak of the earliest path,
wherein a first energy valley following the peak of the earliest path is a second number of samples to the peak of the earliest path, and
wherein the RSRP is measured based on the sum of energy of one or more samples only on a side of the peak of the earliest path that is associated with a lower of the first and second numbers of samples to the peak of the earliest path.

11. The method of claim 1,
wherein the RSRP is measured per antenna pair, or
wherein the RSRP is measured as an average RSRP across multiple antenna pairs.

12. The method of claim 1, wherein the wireless node corresponds to a user equipment (UE) or a base station.

13. The method of claim 1, wherein the RS-P corresponds to an uplink sounding reference signal for positioning (UL-SRS-P), a downlink positioning reference signal (DL-PRS), or a sidelink SRS-P (SL-SRS-P).

14. The method of claim 1, wherein the at least one number of samples or a parameter used by the wireless node to derive the at least one number of samples is network-configured.

15. The method of claim 1, further comprising:
reporting the RSRP to an external entity.

16. The method of claim 15, further comprising:
reporting another RSRP measurement that is based upon a sum of energy across multiple paths of the RS-P.

17. The method of claim 1, further comprising:
deriving an angular measurement based on the RSRP.

18. The method of claim 17, further comprising:
reporting the derived angular measurement to an external entity.

19. The method of claim 17, further comprising:
determining a positioning estimate of a user equipment (UE) based on the derived angular measurement.

20. The method of claim 17, wherein the angular mea-surement comprises a downlink angle of departure (DL-AoD) measurement or an uplink angular of arrival (UL-AoA) measurement.

21. A wireless node, comprising:

a memory;

at least one transceiver; and at least one processor communicatively coupled to the memory and the at least one transceiver, the at least one processor configured to:

receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

22. The wireless node of claim 21, wherein the at least one number of samples includes a single number of samples, such that the RSRP is measured based on the sum of energy of the same number of samples on both sides of the peak of the earliest path.

23. The wireless node of claim 22, wherein the single number of samples is derived as a function of the respective bandwidth and an oversampling factor used to compute an Inverse Fast Fourier Transform (IFFT) samples of the RS-P.

24. The wireless node of claim 22, wherein the single number of samples is zero, and wherein the sum of energy includes energy of a sample associated with the peak of the earliest path only.

25. The wireless node of claim 22, wherein a time threshold is defined relative to the peak of the earliest path, and wherein the RSRP is measured based on the sum of energy of any sample that falls inside of the time threshold on either side of the peak of the earliest path.

26. The wireless node of claim 25, wherein the time threshold is based on the respective bandwidth, or wherein the time threshold is a network-configured parameter.

27. The wireless node of claim 21, wherein the at least one number of samples comprises a first number of samples preceding the peak of the earliest path and a second number of samples following the peak of the earliest path, the first and second numbers of samples being different.

28. The wireless node of claim 27, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

29. The wireless node of claim 21, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

30. The wireless node of claim 21, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

31. The wireless node of claim 21, wherein the RSRP is measured per antenna pair, or wherein the RSRP is measured as an average RSRP across multiple antenna pairs.

32. The wireless node of claim 21, wherein the wireless node corresponds to a user equipment (UE) or a base station.

33. The wireless node of claim 21, wherein the RS-P corresponds to an uplink sounding reference signal for positioning (UL-SRS-P), a downlink positioning reference signal (DL-PRS), or a sidelink SRS-P (SL-SRS-P).

34. The wireless node of claim 21, wherein the at least one number of samples or a parameter used by the wireless node to derive the at least one number of samples is network-configured.

35. The wireless node of claim 21, wherein the at least one processor is further configured to:

report the RSRP to an external entity.

36. The wireless node of claim 35, wherein the at least one processor is further configured to:

report another RSRP measurement that is based upon a sum of energy across multiple paths of the RS-P.

37. The wireless node of claim 21, wherein the at least one processor is further configured to:

derive an angular measurement based on the RSRP.

38. The wireless node of claim 37, wherein the at least one processor is further configured to:

report the derived angular measurement to an external entity.

39. The wireless node of claim 37, wherein the at least one processor is further configured to:

determine a positioning estimate of a user equipment (UE) based on the derived angular measurement.

40. The wireless node of claim 37, wherein the angular measurement comprises a downlink angle of departure (DL-AoD) measurement or an uplink angular of arrival (UL-AoA) measurement.

41. A wireless node, comprising:

means for receiving a reference signal for positioning (RS-P) over a respective bandwidth on one or more paths including an earliest path; and means for measuring a reference signal received power (RSRP) associated with the earliest path of the RS-P based on a sum of energy on the respective bandwidth within at least one number of samples from a peak of the earliest path.

42. The wireless node of claim 41, wherein the at least one number of samples includes a single number of samples, such that the RSRP is measured based on the sum of energy of the same number of samples on both sides of the peak of the earliest path.

43. The wireless node of claim 42, wherein the single number of samples is derived as a function of the respective bandwidth and an oversampling factor used to compute an Inverse Fast Fourier Transform (IFFT) samples of the RS-P.

44. The wireless node of claim 42, wherein the single number of samples is zero, and wherein the sum of energy includes energy of a sample associated with the peak of the earliest path only.

45. The wireless node of claim 42, wherein a time threshold is defined relative to the peak of the earliest path, and wherein the RSRP is measured based on the sum of energy of any sample that falls inside of the time threshold on either side of the peak of the earliest path.

46. The wireless node of claim 45, wherein the time threshold is based on the respective bandwidth, or wherein the time threshold is a network-configured parameter.

47. The wireless node of claim 41, wherein the at least one number of samples comprises a first number of samples preceding the peak of the earliest path and a second number of samples following the peak of the earliest path, the first and second numbers of samples being different.

48. The wireless node of claim 47, wherein the first number of samples comprises one or more samples from the peak of the earliest path to a first energy valley preceding the peak of the earliest path, and wherein the second number of samples comprises at least one sample from the peak of the earliest path to a first energy valley following the peak of the earliest path.

49. The wireless node of claim 41, wherein a first energy valley preceding the peak of the earliest path is associated with a first energy, wherein a first energy valley following the peak of the earliest path is associated with a second energy, and wherein the RSRP is measured based on the sum of energy of one or more samples only on a side of the peak of the earliest path that is associated with a lower of the first and second energies.

50. The wireless node of claim 41, wherein a first energy valley preceding the peak of the earliest path is a first number of samples to the peak of the earliest path, wherein a first energy valley following the peak of the earliest path is a second number of samples to the peak of the earliest path, and wherein the RSRP is measured based on the sum of energy of one or more samples only on a side of the peak of the earliest path that is associated with a lower of the first and second numbers of samples to the peak of the earliest path.

51. The wireless node of claim 41, wherein the RSRP is measured per antenna pair, or wherein the RSRP is measured as an average RSRP across multiple antenna pairs.

52. The wireless node of claim 41, wherein the wireless node corresponds to a user equipment (UE) or a base station.

53. The wireless node of claim 41, wherein the RS-P corresponds to an uplink sounding reference signal for positioning (UL-SRS-P), a downlink positioning reference signal (DL-PRS), or a sidelink SRS-P (SL-SRS-P).

54. The wireless node of claim 41, wherein the at least one number of samples or a parameter used by the wireless node to derive the at least one number of samples is network-configured.

55. The wireless node of claim 41, further comprising:

means for reporting the RSRP to an external entity.

56. The wireless node of claim 55, further comprising:

means for reporting another RSRP measurement that is based upon a sum of energy across multiple paths of the RS-P.

57. The wireless node of claim 41, further comprising:

means for deriving an angular measurement based on the RSRP.

58. The wireless node of claim 57, further comprising:

means for reporting the derived angular measurement to an external entity.

59. The wireless node of claim 57, further comprising:

means for determining a positioning estimate of a user equipment (UE) based on the derived angular measurement.

60. The wireless node of claim 57, wherein the angular measurement comprises a downlink angle of departure (DL-AoD) measurement or an uplink angular of arrival (UL-AoA) measurement.

61. A non-transitory computer-readable medium storing a set of instructions, the set of instructions comprising one or more instructions that, when executed by one or more processors of a wireless node, cause the wireless node to:

receive a reference signal for positioning (RS-P) over a respective bandwidth on one or more paths including an earliest path; and measure a reference signal received power (RSRP) associated with the earliest path of the RS-P based on a sum of energy on the respective bandwidth within at least one number of samples from a peak of the earliest path.

\* \* \* \* \*